US007008807B2

(12) United States Patent
Otake et al.

(10) Patent No.: US 7,008,807 B2
(45) Date of Patent: Mar. 7, 2006

(54) MANUFACTURING METHOD OF ELECTRO-OPTICAL DEVICE SUBSTRATE AND MANUFACTURING METHOD OF ELECTRO-OPTICAL DEVICE

(75) Inventors: Toshihiro Otake, Okaya (JP); Mutsumi Matsuo, Misato-mura (JP)

(73) Assignee: Seiko Epson Corporation, (JP)

( * ) Notice: Subject to any disclaimer, the term of this patent is extended or adjusted under 35 U.S.C. 154(b) by 75 days.

(21) Appl. No.: 10/683,166

(22) Filed: Oct. 10, 2003

(65) Prior Publication Data

US 2004/0115846 A1 Jun. 17, 2004

(30) Foreign Application Priority Data

Oct. 11, 2002 (JP) .............................. 2002-298986
Aug. 18, 2003 (JP) .............................. 2003-294688

(51) Int. Cl.
*H01L 21/302* (2006.01)
*G02F 1/1335* (2006.01)

(52) U.S. Cl. ........................................ 438/29; 349/114
(58) Field of Classification Search .................. 438/22, 438/24, 29, 30, 34, 69, 71, 72, 27, 116; 349/112, 349/113, 114
See application file for complete search history.

(56) References Cited

U.S. PATENT DOCUMENTS

| | | | | |
|---|---|---|---|---|
| 5,408,345 | A * | 4/1995 | Mitsui et al. ................. 349/42 |
| 6,295,109 | B1 * | 9/2001 | Kubo et al. .................. 349/119 |
| 6,376,271 | B1 * | 4/2002 | Sawayama et al. ........... 438/30 |
| 6,452,653 | B1 | 9/2002 | Yamanaka et al. |
| 6,452,654 | B1 | 9/2002 | Kubo et al. |
| 6,469,759 | B1 * | 10/2002 | Jang et al. ................... 349/113 |
| 2002/0167009 | A1 * | 11/2002 | Kim .............................. 257/72 |
| 2002/0176029 | A1 * | 11/2002 | Fujino ......................... 349/43 |
| 2003/0017655 | A1 * | 1/2003 | Lai et al. ..................... 438/149 |
| 2003/0142247 | A1 * | 7/2003 | Nishiyama et al. ........... 349/67 |
| 2004/0070709 | A1 * | 4/2004 | Kanou et al. ................ 349/113 |

FOREIGN PATENT DOCUMENTS

| | | |
|---|---|---|
| JP | 11-101992 | 4/1999 |
| JP | 2000-314881 | 11/2000 |
| JP | 2000-321410 | 11/2000 |
| JP | 2000-338480 | 12/2000 |
| JP | 2001-75090 | 3/2001 |
| JP | 2001-141915 | 5/2001 |
| JP | 2002-031799 | 1/2002 |
| JP | 2002-098955 | 4/2002 |
| JP | 2003-043217 | 2/2003 |

(Continued)

OTHER PUBLICATIONS

Communication from Korean Patent Office regarding related application.

(Continued)

*Primary Examiner*—Laura M. Schillinger
*Assistant Examiner*—Jennifer M Dolan
(74) *Attorney, Agent, or Firm*—Harness, Dickey & Pierce, P.L.C.

(57) ABSTRACT

A photosensitive resin applied onto a substrate is exposed using a mask. In this exposure step, by appropriately setting the size of each light transmitting portion formed in the mask and an exposure gap, an exposure intensity profile on a surface of a photosensitive resin is formed so as to have an increasing and decreasing curve along the surface thereof. When the exposure is performed in accordance with the exposure intensity profile, followed by development, a resin layer having surface irregularities is formed. Subsequently, a reflection layer made of a metal thin film or the like is formed on this resin layer.

12 Claims, 15 Drawing Sheets

FOREIGN PATENT DOCUMENTS

| | | |
|---|---|---|
| JP | 2003-075987 | 3/2003 |
| JP | 2003-302633 | 10/2003 |
| JP | 2003-302740 | 10/2003 |
| JP | 2003-302741 | 10/2003 |
| JP | 2003-302742 | 10/2003 |
| JP | 2003-315514 | 11/2003 |
| JP | 2003-315515 | 11/2003 |

OTHER PUBLICATIONS

Communication from Japanese Patent Office re: related application.

* cited by examiner

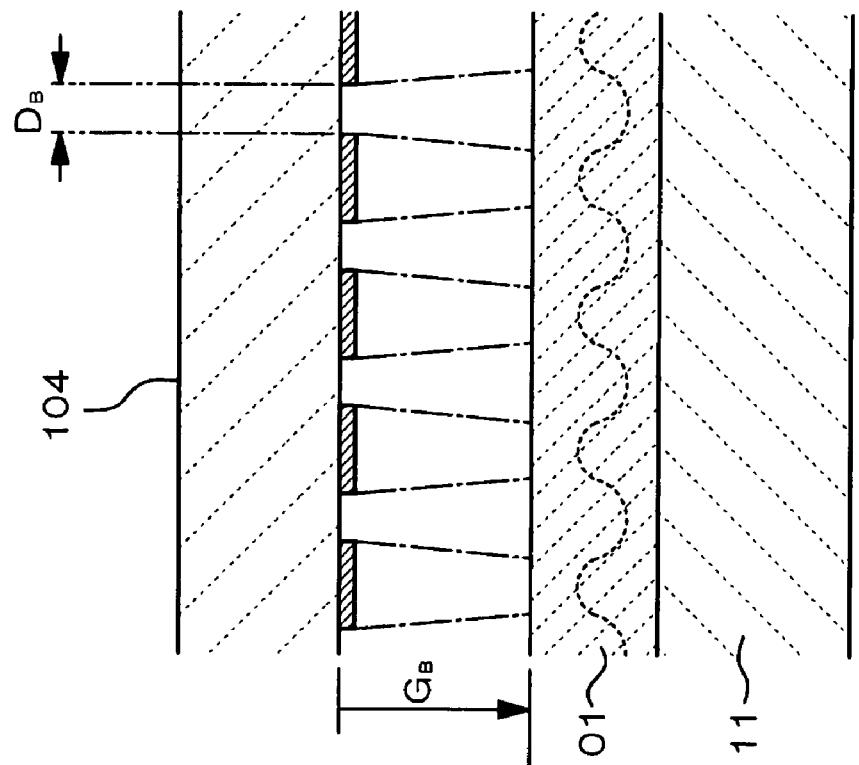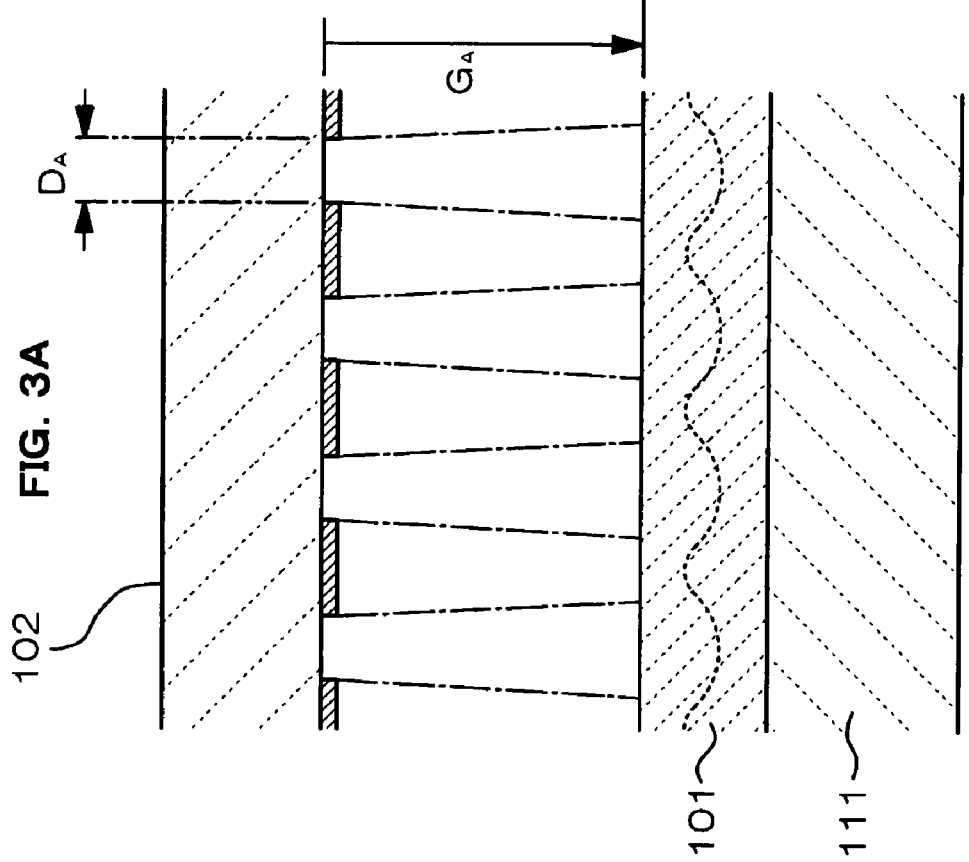

MANUFACTURING METHOD OF ELECTRO-OPTICAL DEVICE SUBSTRATE AND MANUFACTURING METHOD OF ELECTRO-OPTICAL DEVICE

BACKGROUND OF THE INVENTION

1. Field of the Invention

The present invention relates to methods for manufacturing electro-optical device substrates and methods for manufacturing electro-optical devices, and more particularly, relates to a manufacturing technique of a reflection substrate, which is composed of a resin layer having surface irregularities and a reflection layer provided thereon, and of an electro-optical device.

2. Description of the Related Art

In some liquid crystal display devices, which is one type of an electro-optical device, a reflection layer for reflecting light is formed. This reflection layer is provided for forming a reflective liquid crystal display device in which an image formed in accordance with an optical state of the liquid crystal can be viewed using reflected light generated by reflection of external light. In addition, a transflective liquid crystal display device has been known which has a transflective layer formed by providing light transmitting portions in parts of a reflection layer and which is capable of performing both transmissive and reflective display.

When the reflection layer described above is formed to have an optically flat reflective surface, since incident external light is specularly reflected from the optically flat reflective surface, known problems may arise, for example, in that an observer is dazzled by reflection of illumination light, and that the visibility of a display screen is degraded by reflection of a surrounding scene thereon.

Accordingly, various techniques have been proposed in which reflected light is appropriately scattered by irregularities formed on a reflection surface of a reflection layer for suppressing or avoiding the above mentioned dazzle caused by illumination light and the reflection of a surrounding scene on a screen. For example, in a transflective liquid crystal display device, a glass having a frosted surface is formed by etching or the like, and a reflection layer made of a metallic aluminum thin film or the like is provided thereon, thereby forming a reflection surface having irregularities.

In addition, as another method for forming the reflection surface having irregularities described above, a method has been proposed which comprises the steps of applying a photosensitive resin onto a glass substrate, exposing and developing this photosensitive resin using a predetermined mask pattern to form a resin layer having irregularities or resin layers randomly dispersed, melting the resin layer(s) by heating so as to smooth the irregularities thereof to some extent, further applying an organic resin on the resin layer(s) so as to form relatively smooth surface irregularities, and then forming the reflection layer thereon.

However, according to the methods described above, since a surface having appropriate irregularities must be formed on an underlayer surface of the reflection layer, for example, etching conditions (such as the composition of an etchant and an etching time) for a glass substrate and/or heating temperature and time for the resin layer must be precisely controlled and adjusted. Accordingly, precise irregularities of the reflection surface are difficult to obtain with good reproducibility; hence, a two-stage etching process must be performed, or a resin layer having a two-layered structure must be formed in some cases. As a result, the manufacturing time is increased, and the manufacturing cost is disadvantageously increased.

In addition, when the distribution angle of scattering light determined by the irregularities of a reflection layer is not uniform, since external light cannot be efficiently used for display, problems relating to display quality may arise in some cases in that the displayed image is darkened, the brightness is abruptly changed at a specific angle, the viewing angle properties are substantially degraded, and the like.

Accordingly, the present invention was made to solve the problems described above, and an object of the present invention is to provide a manufacturing method of an electro-optical device substrate, in which irregularities on a reflection surface can be rapidly formed at a low cost as compared to the conventional method, and to provide a manufacturing method of an electro-optical device. In addition, another object of the present invention is to improve the display quality of a reflective display of electro-optical device as compared to the conventional method by improving the scattering properties of a reflection surface.

SUMMARY

In order to solve the problems described above, a method for manufacturing an electro-optical device substrate, according to the present invention, comprises: an exposure step of exposing a photosensitive resin disposed on a substrate using a mask pattern provided with a light transmitting portion and a light shading portion; a developing step of developing the resin thus exposed; and a reflection layer forming step of forming a reflection layer on the resin. In the manufacturing method described above, the size of the light transmitting portion or the light shading portion of the mask pattern and an exposure gap between the mask pattern and the resin are set so as to obtain an exposure intensity profile having an increasing and decreasing curve along the surface of the resin in the exposure step, and hence in the developing step, the resin is formed into a resin layer having surface irregularities in accordance with the exposure intensity profile.

According to the present invention, the exposure intensity profile is formed so as to have an increasing and decreasing curve along the surface of the photosensitive resin in the exposure step, and the exposure is performed in accordance with this exposure intensity profile, thereby forming the resin layer having surface irregularities in accordance with the exposure intensity profile in the developing step. Accordingly, since a two-stage etching process or a two-layered resin layer is not necessary, and the surface irregularities can be formed by one patterning process, an electro-optical device substrate provided with a reflection layer having irregularities can be rapidly formed at a low cost.

Among conventional techniques, when a photolithographic technique is used for forming surface irregularities on a resin layer by patterning, since the irregularities thus formed are excessively sharp in general, the irregularities are smoothed by heating or by forming a second resin layer thereon. However, in the present invention, when the size of the light transmitting portion or the light shading portion of the mask pattern and the exposure gap between the mask pattern and the photosensitive resin are appropriately set so as to control the diffraction angle of light by the size of the light transmitting portion or the light shading portion of the mask and the spread amount of diffracted light by a mask pattern with the exposure gap G, the exposure intensity profile can be formed to have an increasing and decreasing curve, and as a result, the surface irregularities of the resin layer formed by development has the desired smooth irregularities. As described above, since the sharpness and smoothness of the surface irregularities can be controlled by the size of the light transmitting portion or the light shading portion and the exposure gap, a resin layer having appropriate surface irregularities can be obtained by one exposure/development process.

In general, when the surface irregularities of a resin layer are excessively sharp, due to the increase in the scattering angle of reflected light reflected from a reflection layer provided on the resin layer, the regular reflectance ratio is decreased, and as a result, the display becomes dark. On the other hand, when the surface irregularities of a resin layer are excessively smooth, due to the decrease in scattering angle of the reflected light reflected from a reflection layer provided on the resin layer, the regular reflectance ratio is increased, and as a result, the display becomes bright; however, as the reflection surface becomes a mirror surface, the dazzle by illumination light and the reflection of a surrounding scene on a screen become significant. Accordingly, by forming surface irregularities having an appropriate curvature on a resin layer, the desired brightness and visibility can both be obtained. In this case, by controlling only the exposure gap or the diameter of the light transmitting portion of the mask pattern, an exposure intensity profile, which has an increasing and decreasing curve along appropriate surface irregularities, is difficult to obtain. For example, even when only the diameter of the light transmitting portion is increased or decreased, since the distance between the mask pattern irregularities and the open area ratio thereof are limited to a certain level, the degree of diffraction of an exposure wavelength $\lambda$ is not significantly changed. As a result, although the distance between the mask pattern irregularities may be changed to some extent, it is difficult to control the curvature of the irregularities. In addition, when only the exposure gap is increased or decreased, depending on the diameter of the light transmitting portion, an exposed area may only be changed, and it may be difficult to control the curvature of the irregularities in some cases. In addition, the curvature of the irregularities may be excessively changed by the change in exposure gap in some cases, and as a result, a resin layer having appropriate surface irregularities is difficult to obtain.

The present invention was made to control curved surface irregularities of surface regions on the resin layer, which surface regions correspond to the boundary regions between the light transmitting portions or between the light shading portions, and the present invention includes the case in which parts of the resin layer distant from the surface regions described above have flat portions. In addition, the present invention also include the case in which parts of an underlayer surface are exposed since the resin layer is not present at positions distant from the above surface regions. The resin layer may be formed so that most parts of the surface thereof have smooth curved surface irregularities, and even when flat portions or exposed underlayer portions are present to some parts, superior optical properties can also be obtained.

In the present invention, it is preferable that concave portions, which correspond to the light transmitting portions, be formed on the surface of the resin layer by dispersing the light transmitting portions, which are formed as a plurality of islands, in the mask pattern and by forming the light shading portion around the peripheries of the light transmitting portions. In this case, a part of the resin layer exposed by light passing through the light transmitting portion of the mask pattern is formed into the concave portion. In this step, by the size of the light transmitting portion and the gap, the degree of diffraction of light passing through the light transmitting portion can be changed, and hence the surface of the concave portions can be formed as a smooth surface.

In this case, it is preferable that an exposure wavelength $\lambda$ in the exposure step be set in the range of 300 to 450 nm, the diameter of the light transmitting portion be set in the range of approximately 9 to 12 $\mu$m, and the exposure gap be set in the range of approximately 150 to 250 $\mu$m. Accordingly, by setting the diameter of the light transmitting portion in the above range, the light passing through the light transmitting portion can be diffracted at an appropriate angle, and in addition, by setting the exposure gap G in the above range, the spread of the diffracted light can be controlled. Hence, on the surface of the photosensitive resin, a curved exposure intensity profile having an appropriate curvature can be formed.

In the present invention, it is preferable that convex portions, which correspond to the light shading portions, be formed on the surface of the resin layer by dispersing the light shading portions, which are formed as a plurality of islands, in the mask pattern and by forming the light transmitting portion around the peripheries of the light shading portions. In this case, a part of the resin layer where the light is shaded by the light shading portion of the mask pattern is formed into the convex portion. In this step, by the size of the light shading portion and the gap, the degree of diffraction of light can be changed at a place which is shaded by the light shading portion, and hence the surface of the convex portions can be formed smoothed.

In this case, it is preferable that an exposure wavelength $\lambda$ in the exposure step be set in the range of 300 to 450 nm, the diameter of the light shading portion be set in the range of approximately 8 to 12 $\mu$m, and the exposure gap be set in the range of approximately 60 to 100 $\mu$m. In general, since a mask pattern in which island shape light shading portions are dispersed has a larger area of light transmitting portions and a higher open area ratio than those of a mask pattern in which island shape light transmitting portions are dispersed, the diffracted light must be decreased by decreasing the inclination exposure gap for the convex portions. In addition, in accordance with the increase in open area ratio of the mask pattern, in general, the exposure intensity must be decreased. For example, in the case in which a mask pattern is used which has an shading ratio of approximately 30% (open area ratio of approximately 70%) and which is provided with dispersed island shape light shading portions, the exposure intensity is preferably set to about half of that in the case in which a mask pattern is used which has an open area ratio of approximately 30% and which is provided with dispersed island shape light transmitting portions.

In the present invention, the method for manufacturing an electro-optical device substrate may further comprises a transparent portion forming step of forming transmitting portions by removing parts of the reflection layer after the reflection layer forming step. By the step described above, a transflective electro-optical device having transmitting portions can be formed.

In this case, in the transmitting portion forming step of forming transmitting portions, the parts of the reflection layer are preferably removed together with parts of the resin layer provided thereunder. Accordingly, since the resin layer is not present at the transmitting portions, coloring of a transmissive display can be avoided.

Next, in accordance with another aspect of the present invention, there is provided a method for manufacturing an electro-optical device having an electro-optical material; an electric field-applying structure including an electrode which applies an electric field to the electro-optical material so as to control the optical properties thereof; a resin layer which overlaps the electro-optical material in plan view and which has surface irregularities; and a reflection layer which is provided on the surface irregularities and which has a reflection surface in conformity with the surface irregularities. The method described above comprises: an exposure step of exposing a photosensitive resin using a mask pattern having a light transmitting portion and a light shading portion; and a developing step of developing the exposed resin for forming the resin layer, wherein the size of the light transmitting portion or the light shading portion of the mask pattern and an exposure gap between the mask pattern and the resin are set so as to obtain an exposure intensity profile having an increasing and decreasing curve along the surface of the resin in the exposure step, whereby, in the developing step, the resin layer having the surface irregularities, which are in accordance with the exposure intensity profile, is formed.

In the present invention, it is preferable that concave portions, which correspond to the light transmitting portions, be formed on the surface of the resin layer by dispersing the light transmitting portions, which are formed as a plurality of islands, in the mask pattern and by forming the light shading portion around the peripheries of the light transmitting portions. In the case described above, it is preferable that an exposure wavelength λ in the exposure step be set in the range of 300 to 450 nm, the diameter D of the light transmitting portion be set in the range of approximately 9 to 12 μm, and the exposure gap G be set in the range of approximately 150 to 250 μm.

In the present invention, it is preferable that convex portions, which correspond to the light shading portions, be formed on the surface of the resin layer by dispersing the light shading portions, which are formed as a plurality of islands, in the mask pattern and by forming the light transmitting portion around the peripheries of the light shading portions. In the case described above, it is preferable that an exposure wavelength λ in the exposure step be set in the range of 300 to 450 nm, the diameter of the light shading portion be set in the range of approximately 8 to 12 μm, and the exposure gap be set in the range of approximately 60 to 100 μm.

In the present invention, it is preferable to perform a transmitting portion forming step of forming transmitting portions by removing parts of the reflection layer. In this case, in the transmitting portion forming step of forming transmitting portions, the parts of the reflection layer are preferably removed together with parts of the resin layer provided thereunder.

As has thus been described, according to the present invention, when an electro-optical device substrate is formed, irregularities on the reflection layer thereof can be rapidly obtained at a low cost as compared to those obtained in the past.

BRIEF DESCRIPTION OF THE DRAWINGS

FIG. 3 includes explanatory views of exposure steps of a manufacturing method of the above electro-optical device substrate according to an example in FIG. 3(A) and a comparative example in FIG. 3(B).

DESCRIPTION OF THE PREFERRED EMBODIMENTS

Next, with reference to accompanying drawings, embodiments of a manufacturing method of a reflection substrate and a manufacturing method of an electro-optical device, according to the present invention, will be described in detail.

First Embodiment: Reflection Substrate

First, as a first embodiment of the present invention, a manufacturing method of a reflection substrate for an electro-optical device will be described with reference to FIGS. 1 and 2. FIGS. 1(a) to 1(d) show steps of the manufacturing method of the reflection substrate for an electro-optical device, according to the embodiment of the present invention, and FIGS. 2(a) to 2(c) show steps of the above manufacturing method.

Figure 1A:
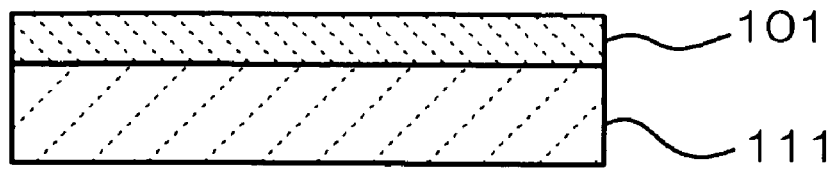
FIGS. 1(a) to 1(d) show steps of a manufacturing method of an electro-optical device substrate of a first embodiment according to the present invention.
Figure 1B:
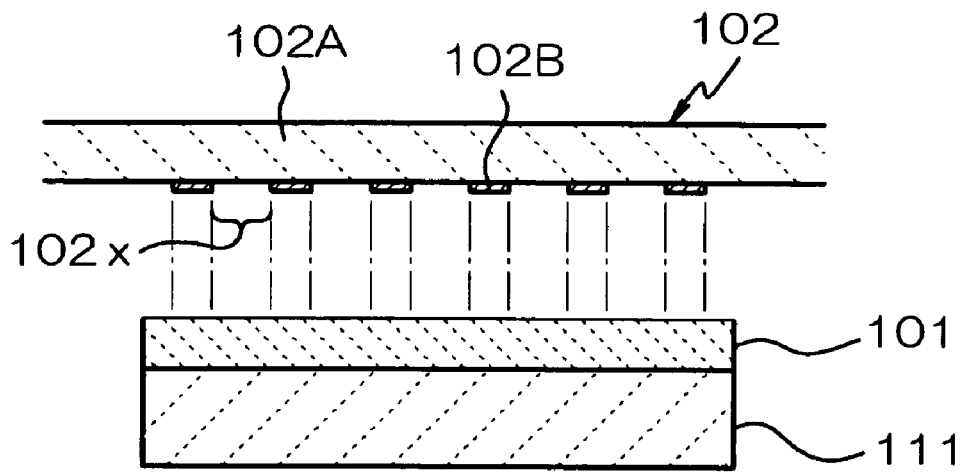
Figure 4A:
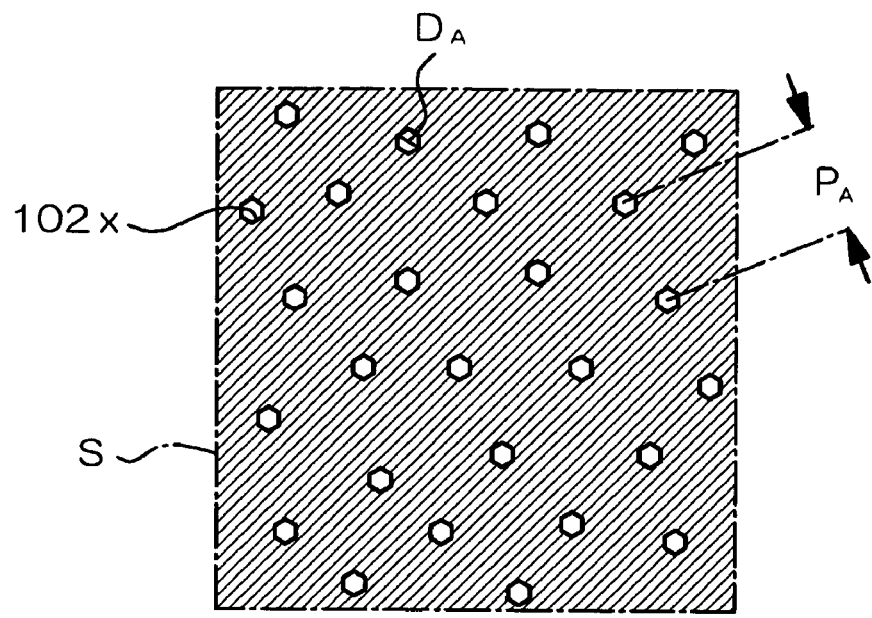
FIG. 4 includes explanatory views of mask patterns of unit areas S in an exposure step of a manufacturing method of the above electro-optical device substrate according to an example in FIG. 4(A) and a comparative example in FIG. 4(B).

In this embodiment, as shown in FIG. 1(a), first, a substrate 111 made of a transparent material such as glass or plastic is washed, and a photosensitive resin 101 primarily composed of an acrylic resin is applied onto a surface of the substrate 111 by coating or the like. Next, as shown in FIG. 1(b), the photosensitive resin 101 is exposed using a mask 102. In this step, the mask 102 is formed of a transparent substrate 102A made of glass or the like and a thin light shading layer 102B provided on the surface thereof, which is made of chromium (Cr) or the like. In this mask 102, as shown in FIG. 4(A), light transmitting portions 102x, which are formed as a plurality of islands, are randomly dispersed in a unit region S. The peripheries of the light transmitting portions 102x is a light shading portion made of the light shading layer 102B. That is, the light transmitting portions 102x are openings formed in the light shading layer 102B. The shape of the light transmitting portion 102x may not be specifically limited, and for example, a circular, oval, elliptic, and polygonal shape may be mentioned. However, a circular or a regular polygonal shape (regular tetragon, equilateral pentagon, equilateral hexagon, equilateral octagon, or the like) is particularly preferable. The reason for this is that since the shapes mentioned above are not unsymmetrical in specific directions, uniform optical characteristics can be easily obtained, and in addition, mask formation can also be easily performed. However, when directional dependence of scattering properties is required, the light transmitting portion 102x may have a shape extending in a predetermined direction.

In this exposure step, an ultra high pressure mercury lamp is used. Light of this lamp is mainly composed of three wavelengths (i line of 365 nm, h line of 405 nm, and g line of 436 nm). In this embodiment, since the photosensitive resin 101 is most sensitive to the i line having a wavelength of 365 nm, the photosensitive resin 101 is exposed substantially by the i line (a wavelength of 365 nm) in this exposure step.

Figure 1C:
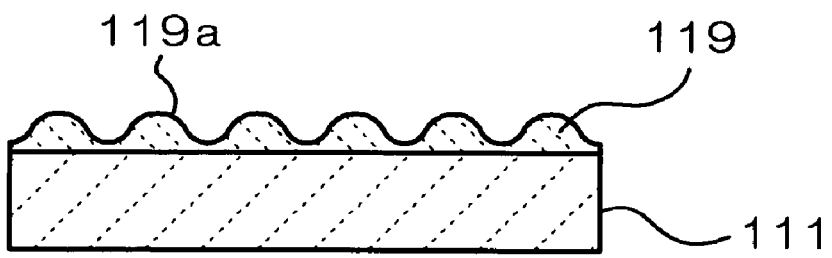
Figure 1D:
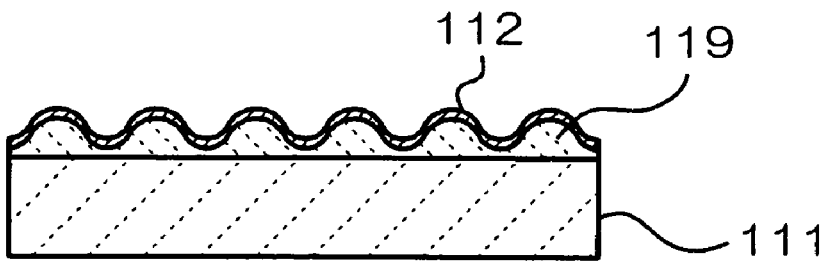

Next, by developing the photosensitive resin 101 using a predetermined developing solution, a step of making irregularities is performed as shown in FIG. 1(c) between a region corresponding to the light transmitting portion 102x of the mask 102 and a region corresponding to the shading portion. In this embodiment, by adjusting a diameter D of the light transmitting portion 102x and an exposure gap G between the photosensitive resin 101 and the mask 102, the exposure intensity profile along the surface of the photosensitive resin 101, in particular, the exposure intensity profile of the surface region corresponding to the light transmitting portion 102x and the vicinity thereof, is formed so as to smoothly increase and decrease (undulate), and subsequently the exposure is performed in the state described above. In the developing step, the amount of the resin in accordance with the exposure intensity profile is removed from the surface of the photosensitive resin 101. Accordingly, as shown in the figure, a resin layer 119 having relatively smooth surface irregularities 119a can be obtained. The surface irregularities 119a have the structure in which island shape concave portions are dispersed corresponding to the island shape light transmitting portions 102x. This structure will be described later in detail.

Next, a metal thin film made of aluminum, silver, a silver alloy (APC alloy or the like), or chromium is provided on the surface of the resin layer 119 composed as above described thus obtained to form a reflection layer 112. Since the surface irregularities 119a are formed on the resin layer 119 used as an underlayer surface, the reflection layer 112 has a reflection surface having irregularities in accordance with the surface irregularities 119a. Hence, on the reflection surface of the reflection layer 112, island shape convex portions corresponding to the surface irregularities 119a are dispersed.

Figure 2A:
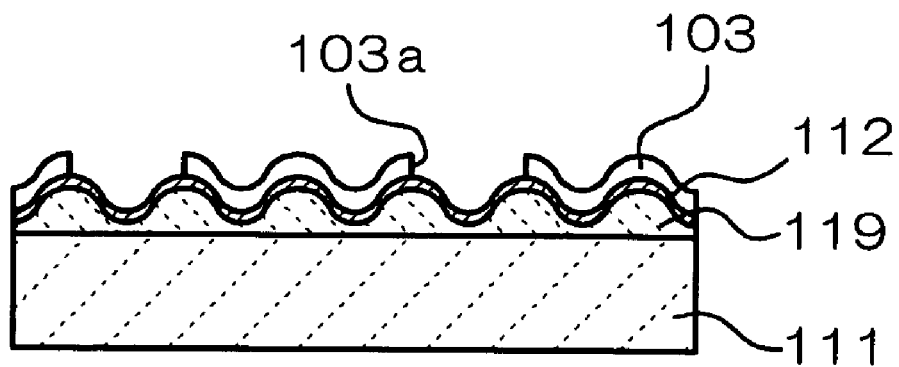
FIGS. 2(a) to 2(c) show steps of a manufacturing method of the above electro-optical device substrate.
Figure 2B:
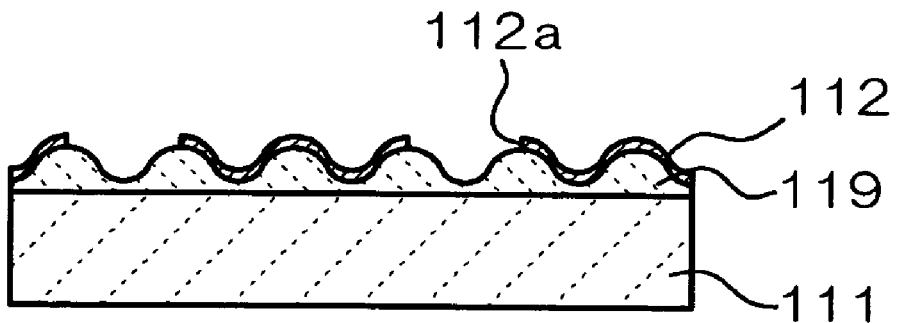

Next, as shown in FIG. 2(a), on the surface of the reflection layer 112, a mask 103, composed of a resist or the like, is formed by a common photolithographic method. The mask 103 is provided with windows 103a therein at region which the reflection layer 112 are not necessary. By performing etching using this mask 103, the reflection layer 112 provided with window portions 112a is formed as shown in FIG. 2(b). As described above, a transflective type reflection substrate 110 is formed.

Figure 2C:
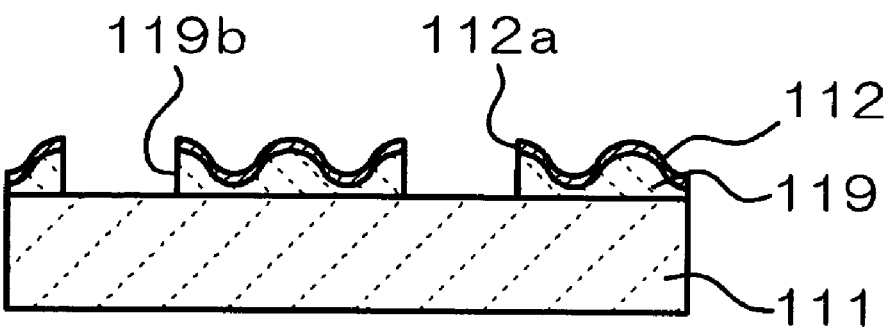

In the above etching step, a reflection substrate 110' may be formed by removing the reflection layer 112 together with the resin layer 119 so that the window portions 112a of the reflection layer 112 and window portion 119b of the resin layer 119 overlap each other in plan view as shown in FIG. 2(c). In addition, after the window portions 119b are formed in a step of forming the resin layer 119, the reflection substrate 110' may be formed by providing the reflection layer 112 having the window portions 112a so that the window portions 112a overlap the window portions 119b. In the case of this reflection substrate 110', since the window portions 119b are formed in the resin layer 119, light passing through the window portions 112a of the reflection layer 112 does not pass through the resin layer 119. Accordingly, the influence on the transmitting light by scattering or refracting effect can be avoided which is caused by slight coloring or the surface irregularities 119a of the resin layer 119.

EXAMPLE

Figure 5:
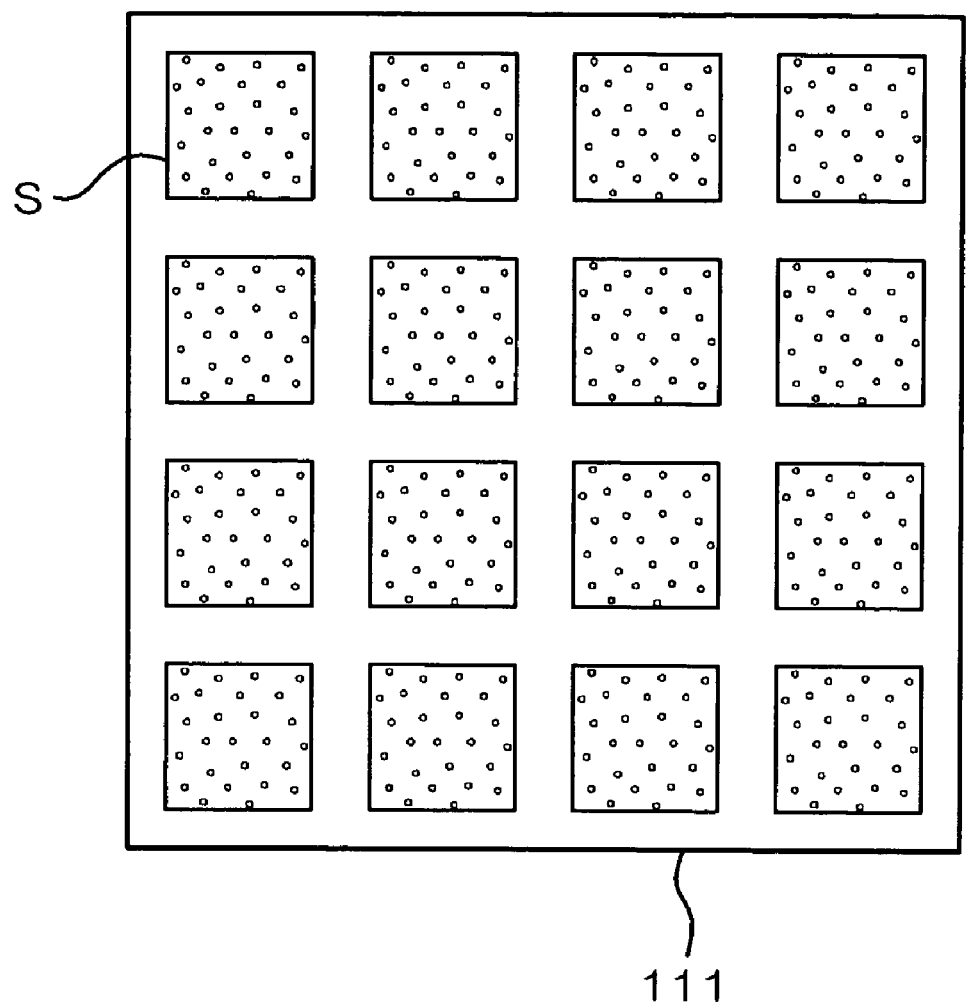
FIG. 5 is a schematic plan view showing the entire structure of a mask pattern used in an exposure step of a manufacturing method of the above electro-optical device substrate.

FIG. 3(A) is an enlarged partial cross-sectional view showing the relationship between the photosensitive resin 101 and the mask 102 on the substrate 111 in an exposure step of a first example of this embodiment. FIG. 4(A) is a plan view showing a mask pattern in a unit area S of the mask 102, and FIG. 5 is a plan view showing the arrangement of the unit areas S disposed over the entire substrate 111 by the pattern of the light shading layers 102B of the mask 102 disposed on the substrate 111. In this example, the thickness of the photosensitive resin 101 was set to 2.0 $\mu$m, a diameter $D_A$ of the light transmitting portion 102x of the mask 102 was set to approximately 10 $\mu$m, and the distance between the top surface of the photosensitive resin 101 and the bottom surface of the mask 102, that is, an exposure gap (space) $G_A$, was set to approximately 180 $\mu$m. In an exposure device, the exposure amount was 80 mJ/cm², and an exposure wavelength λ was 365 nm (i line). In addition, the open area ratio of the light transmission in the unit area S of the mask 102 was set to 30%, and the light transmitting portions 102x were randomly disposed. The average distance $P_A$ between the light transmitting portions 102x shown in FIG. 4(A) was approximately 14 μm.

In this example, since the diameter $D_A$ of the light transmitting portion 102x of the mask 102 and the exposure gap $G_A$ were set as described above, the exposure intensity profile could be formed so as to have an increasing and decreasing curve along the surface of the photosensitive resin 101, and subsequently, by developing the photosensitive resin 101, a smoothly curved surface irregularities in accordance with the exposure intensity profile could be formed as indicated by a dotted line shown in the figure. The regular reflectance ratio of the resin layer 119 thus formed was approximately 1.3 to 3.0%. In order to measure the regular reflectance ratio in this example, light in the visible region (e.g., a wavelength λ of 650 nm) incident at an incident angle 40° was detected by a light sensor provided in a direction at an outgoing angle of 40°. In addition when the reflection layer 112 was formed from aluminum on the surface of this resin layer 119, a regular reflectance ratio of approximately 8 to 20% was obtained. When a flat surface of the resin layer was formed, the regular reflectance ratio obtained was approximately 8.0%, and as the reflection angel of reflected light was increased (that is, the reflected light was scattered) by the surface irregularities, the regular reflectance ratio was decreased as described above. In addition, when a reflection layer made of aluminum was formed on this flat resin layer, a regular reflectance ratio of approximately 95% was obtained. In this example, as the photosensitive resin, a positive type resin was used in which a photosensitive portion was removed by a developing solution; however, a negative type resin may also be used in which the photosensitive portion S becomes insoluble with a developing solution. In this case, the irregularities corresponding to the light transmitting portions of the mask become opposite to those obtained by a positive type resin.

Comparative Example

Figure 4B:
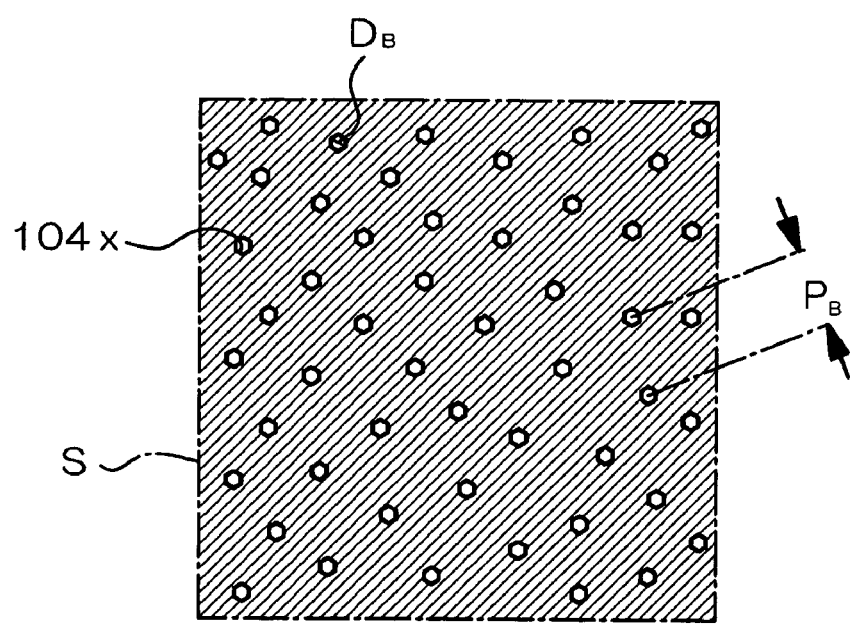
Figure 16A:
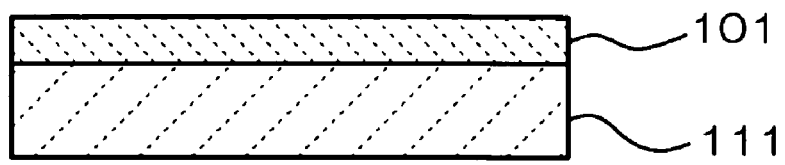
FIGS. 16(a) to (d) include explanatory views of steps of a manufacturing method of an electro-optical device substrate according to a comparative example.
Figure 16B:
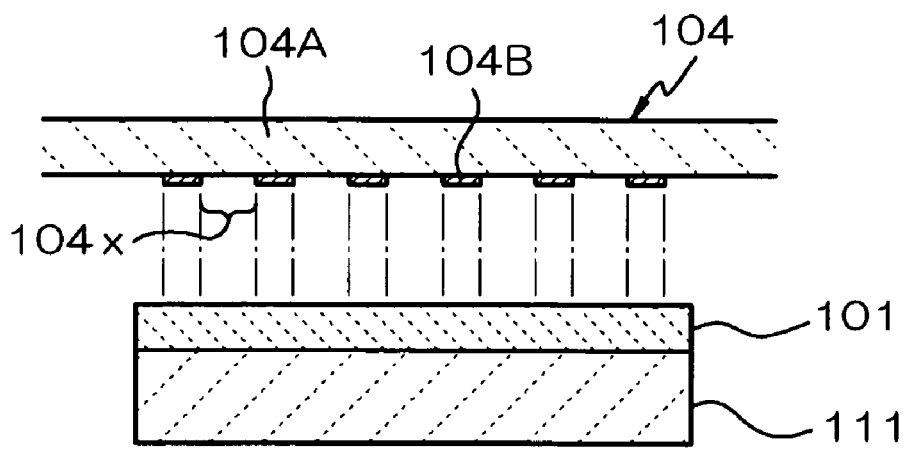
Figure 16C:
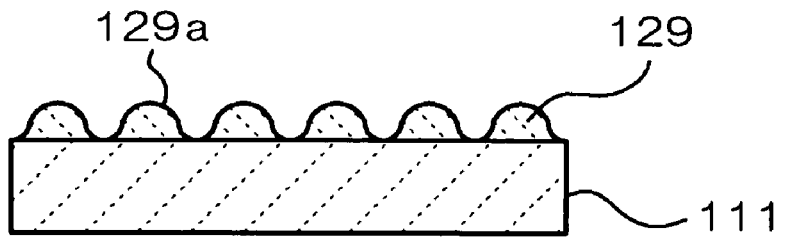

Next, a manufacturing method according to a comparative example will be described, which is to be compared with that of the above example. FIGS. 16 and 17 are explanatory views of the manufacturing method according to the comparative example. In this manufacturing method according to the comparative example, after applying the photosensitive resin 101 onto the substrate 111 so as to have a thickness of 1.6 μm as shown in FIG. 16(a), the photosensitive resin 101 was exposed using a mask 104 as shown in FIG. 16(b). In this step, the mask 104 was formed of a transparent substrate 104A and a shading layer 104B provided thereon, and as was the mask 102, light transmitting portions 104x were randomly disposed. The light transmitting portions 104x were disposed in the unit region S as shown in FIG. 4(B). A diameter $D_B$ of the light transmitting portion 104x was 7.5 μm, which was smaller than that in the above example; however, the open area ratio of the unit region S of the mask 104 was 30%, which was the same as that in the example, and as a result, the average distance $P_B$ between the light transmitting portions 104x was approximately 11 μm.

FIG. 3(B) shows an exposure step according to this comparative example, and FIG. 4(B) shows the planar shape of the unit region S of the mask 104 of the comparative example. In this comparative example, exposure was performed for the photosensitive resin 101 having a thickness of 1.6 μm while the diameter $D_B$ of the light transmitting portion was set to approximately 7.5 μm as described above, and an exposure gap $G_B$ was set to approximately 60 μm. In this step, the exposure wavelength λ and the exposure intensity were the same as those described with reference to FIG. 3(A). In this case, the surface irregularities of a resin layer 129 indicated by a dotted line in FIG. 3(B) and also shown in FIG. 16(c), which was formed after development, became sharp, and the regular reflection was approximately 1.0%. Since the surface irregularities of this resin layer 129 were too sharp, and the regular reflectance ratio was low, a reflection surface which satisfies the display properties of a liquid crystal display device could not be obtained. For example, when this resin layer 129 was practically used, due to an insufficient amount of light contributing to display performance, bright display could not be obtained.

Figure 16D:
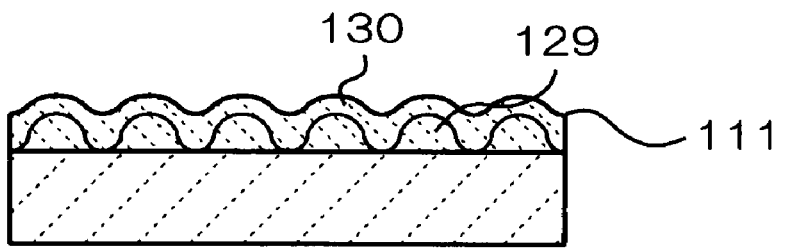
Figure 17A:
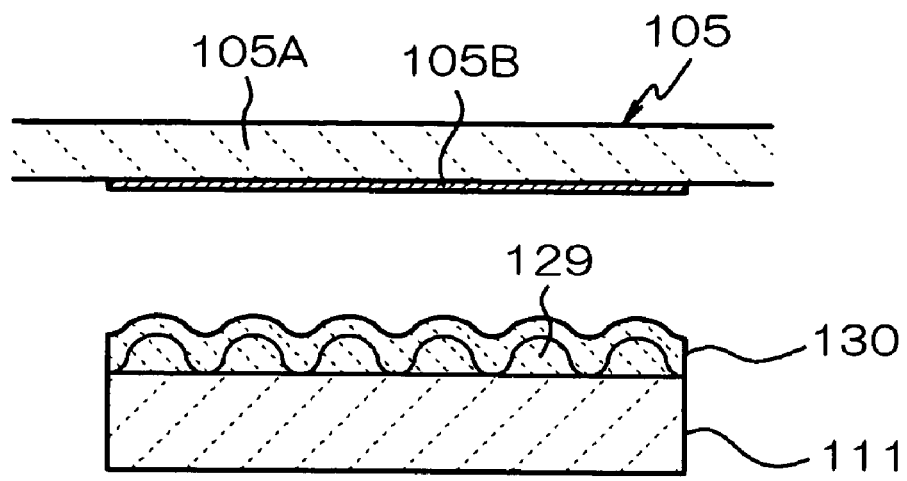
FIGS. 17(a) to (d) include explanatory views of steps of the manufacturing method of an electro-optical device substrate according to the comparative example.
Figure 17B:
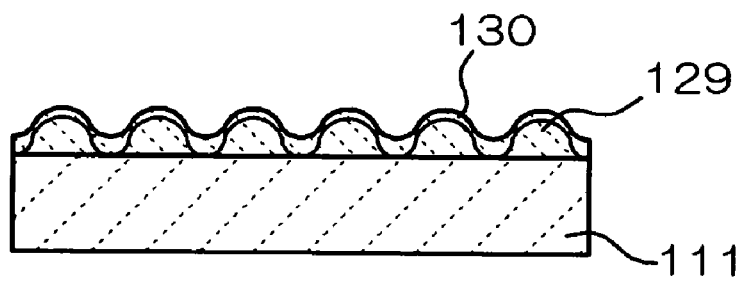

Accordingly, after a photosensitive resin 130 was further applied onto the resin layer 129 so as to have a thickness of 1.3 μm as shown in FIG. 16(d), exposure was performed only for a region other than the unit regions S using a mask 105 having a transparent substrate 105A and a shading layer 105B as shown in FIG. 17(a), and development was then performed for the unit regions S which were not exposed. Next, by firing the resin layer, a two-layered structure of the resin layer 129 and the resin layer 130 was formed, and as a result, smooth surface irregularities approximately equivalent to those in the above example were obtained as shown in FIG. 17(b).

Figure 17C:
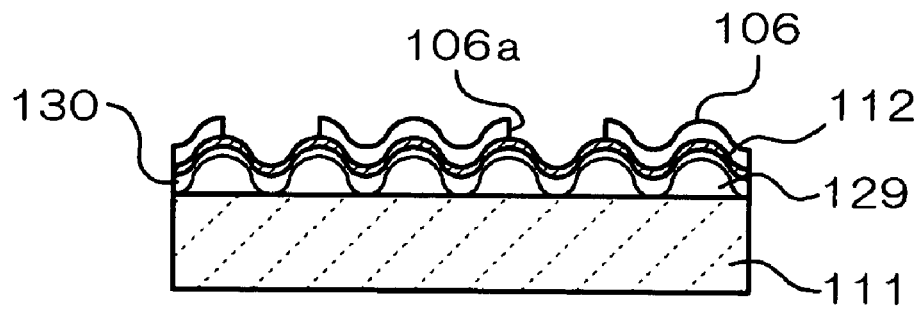
Figure 17D:
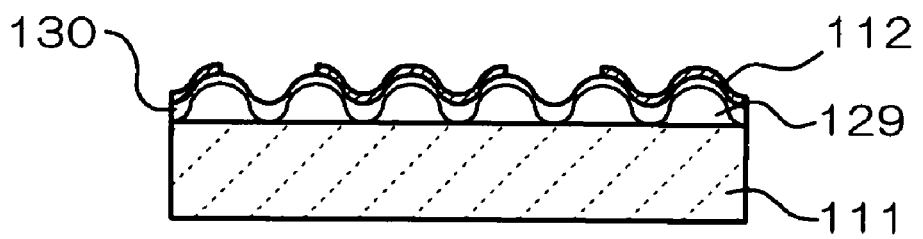

Subsequently, as shown in FIG. 17(c), the reflection layer 112 was formed on the surface of the resin layer 130 from aluminum or the like. In addition, after a resist 106 provided with window portions 106a was formed on the reflection layer 112, etching was performed to form the window portions 112a in the reflection layer 112 as shown in FIG. 17(d), thereby forming a transflective electro-optical device substrate.

In this comparative example, although the reflection surface can be finally formed with irregularities approximately equivalent to those obtained in the example, in order to form a reflection layer having desired reflection characteristics, the resin layer 130 must be further formed on the resin layer 129 formed beforehand by exposure and development steps. Accordingly, the number of manufacturing steps is increased, the manufacturing time is increased, and as a result, the manufacturing cost is disadvantageously increased.

Exposure Conditions

Figure 6:
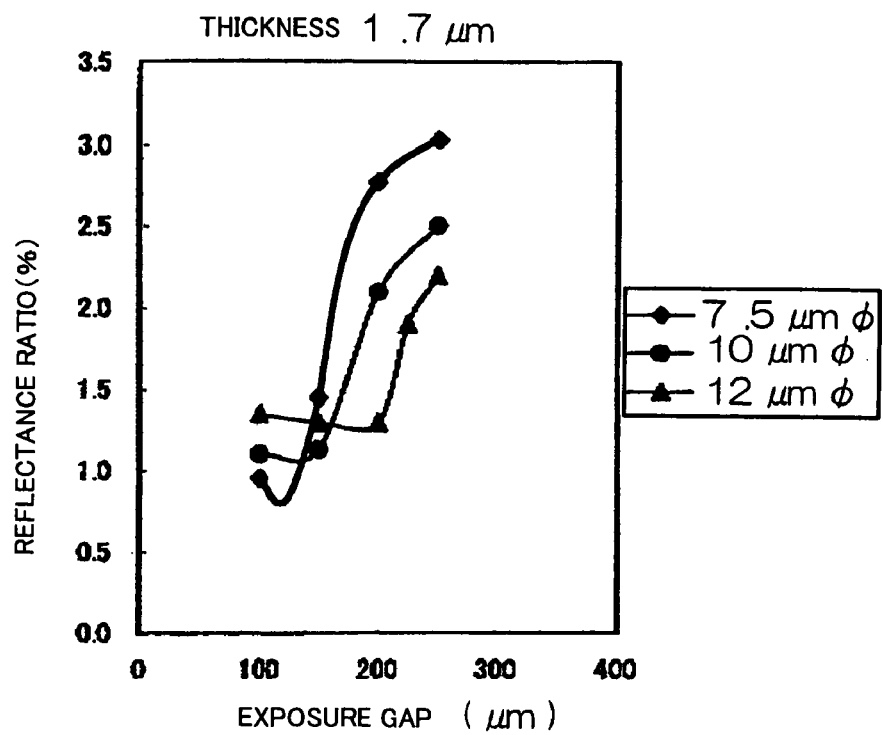
FIG. 6 is a graph showing the relationship of a diameter D and an exposure gap G of a light transmitting portion of a mask used in an exposure step of a manufacturing method of the above electro-optical device substrate with the regular reflectance ratio (parallel reflectance ratio) of a formed resin layer.

Next, referring to FIGS. 6 and 7, the relationship between the conditions of the exposure step of the embodiment according to the present invention and the optical properties of the resin layer formed by the exposure followed by development will be described. FIG. 6 is a graph showing the relationship among the regular reflectance ratio of the resin layer 119, the diameter D of the light transmitting portion of a mask pattern used in the exposure step, and the exposure gap G. In this case, the regular reflectance ratio was measured under the conditions in which the diameters D of the light transmitting portion were set to 7.5, 10.0, and 12.0 μm, and the exposure gap G was changed in the range of 100 to 250 μm. The open area ratio of the mask (ratio of the areas of the window in the unit region S) was always set to 30%. In addition, the thickness of the photosensitive resin was always set to 1.7 μm.

When the diameter D of the light transmitting portion of the mask was small (when the diameter D was 7.5 μm), the regular reflectance ratio was decreased when the exposure gap G was small; however, when the exposure gap G was increased, the regular reflectance ratio was abruptly increased. That is, when the diameter D is small, the rate of change in regular reflectance ratio was increased as the exposure gap G was changed.

On the other hand, when the diameter D was large (when the diameter D was 10 or 12 µm), the rate of change in regular reflectance ratio is small even when the exposure gap G is changed, and in particular, when the exposure gap G was small, the decrease in regular reflectance ratio was not apparent as compared to that when the diameter D was small.

Since the rate of change in regular reflectance ratio increases as the diameter D of the light transmitting portion decreases as described above, it becomes difficult to obtain a desired reflectance ratio precisely or with good reproducibility. Hence, it was found that a diameter D of approximately 7.5 µm is not preferable, and that a diameter D larger than that, such as 9 µm or more, is preferable. In addition, as the diameter D is further increased, since the rate of change in regular reflectance ratio is decreased as shown in FIG. 6, it was found that since the adjustment range of the regular reflectance ratio is narrowed, the diameter D is preferably 12 µm or less.

As shown in FIG. 6, in the region in which the exposure gap G is small, the rate of increase in regular reflectance ratio is small as compared to the increase in exposure gap G, or on the contrary, the regular reflectance is decreased as the exposure gap is increased. The reason for this is believed that when the surface irregularities become sharper as the exposure gap G is decreased, flat portions are adversely increased, and as a result, the regular reflectance ratio is increased. Accordingly, in order to avoid the dazzle caused by illumination light and the reflection of a surrounding scene on a screen, and in addition, in order to control the regular reflectance ratio in a predetermined range (for example, in this example, a range of approximately 1.3 to 3.0%, and a regular reflectance ratio of a reflection layer of approximately 8 to 20%), it was found that the exposure gap is preferably set to 150 µm or more.

That is, when the exposure gap G is less than 150 µm, the regular reflectance ratio may become below an appropriate range of the regular reflectance ratio (approximately 1.3 to 3.0% as described above), and the display may become dark in some cases. In addition, even when the regular reflectance ratio is in the range described above, this is not because the surface irregularities become smoother and is because irregularities are formed of a mixture of flat portions and sharp irregular portions, and as a result, the amount of scattering light is decreased and the display becomes dark.

As also shown in FIG. 6, in the region in which the exposure gap G is large, the regular reflectance ratio is monotonically increased as the exposure gap G is increased. The reason for this is believed that the surface irregularities become smoother as the exposure gap G is increased, and that the regular reflected light is gradually increased as the surface irregularities become smoother. In this region, when the regular reflectance ratio is controlled in an appropriate range, it is believed that preferable surface irregularities as the reflection surface of a liquid crystal display device can be obtained.

In addition, even in the region in which the exposure gap G is large as described above, when the regular reflectance ratio is excessively increased, although the display became bright, the dazzle by above described illumination light or the reflection of a surrounding scene on a screen is enhanced, and as a result, the visibility is degraded. Hence, as described above, in order to obtain an appropriate regular reflectance ratio when the diameter D of the light transmitting portion is in the range of 9 to 12 µm as described above, the exposure gap is preferably set to 250 µm or less.

Figure 7:
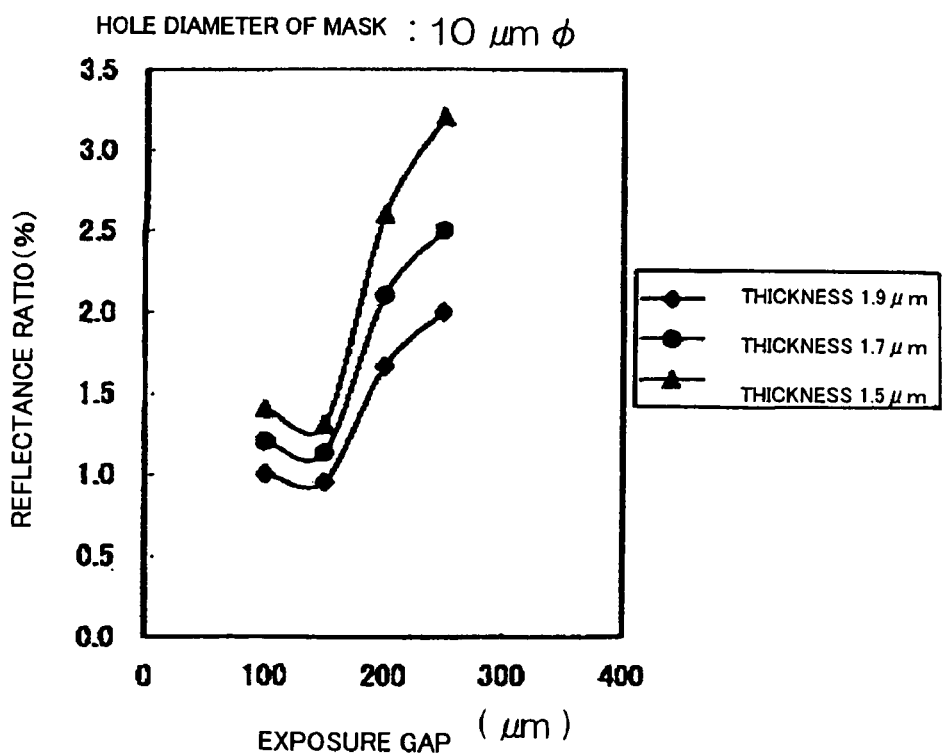
FIG. 7 is a graph showing the relationship of the thickness of a photosensitive resin and an exposure gap G in an exposure step of a manufacturing method of the above electro-optical device substrate with the regular reflectance ratio (parallel reflectance ratio) of a formed resin layer.

FIG. 7 is a graph showing the relationship among the thickness of a photosensitive resin, the exposure gap G, and the regular reflectance ratio of a resin layer obtained when the diameter D of the light transmitting portion was set to 10 µm. In this example, the regular reflectance ratio was measured under the conditions in which the thickness of the photosensitive resin were set to 1.5, 1.7, and 1.9 µm, and the exposure gap was changed in the range of 100 to 250 µm. The open area ratio of the mask (ratio of the areas of the window of the unit region S) was always set to 30%.

According to the result shown in this graph, even when the thickness of the photosensitive resin is changed in the region mentioned above, the tendency of the change in regular reflectance ratio with respect to the change in exposure gap G is not basically changed, and as the thickness of the photosensitive resin is decreased, the regular reflectance ratio tends to be increased on the whole. The reason for this is believed that the regular reflectance is increased since an underlayer surface is exposed at the bottom of a concave portion formed by exposure when the resin layer is thin. At all the thicknesses mentioned above, when the exposure gap G is more than approximately 150 µm, the regular reflectance ratio is monotonically increased. On the other hand, in the region in which the exposure gap G is less than 150 µm, the regular reflectance ratio is gradually increased as the exposure gap G is decreased. In this region in which the exposure gap is less than 150 µm, since the surface irregularities become sharper as the exposure gap G is decreased, and the flat portions are increased as described above, the regular reflectance ratio is increased on the whole, and as a result, the amount of scattering light is decreased and the display becomes dark.

Through the study described above, according to this embodiment, it was found that the diameter $D_A$ of the light transmitting portion of a mask used in an exposure step may be in the range of approximately 9 to 12 µm, and that the exposure gap $G_A$ is preferably in the range of approximately 150 to 250 µm. When the dimensions are in accordance with the ranges described above, the dazzle by illumination light and the reflection of a surrounding scene on a screen can be suppressed, and in addition, the brightness of display can also be ensured. That is, it is believed that surface irregularities preferable as a reflection surface of a liquid crystal display device can be obtained. In particular, when the diameter $D_A$ is in the range of 9.5 to 11 µm, and the exposure gap $G_A$ is in the range of 160 to 200 µm, it is preferable since more superior surface irregularities can be provided.

The range of the diameter of the light transmitting portion of a mask and the range of the exposure gap of this example were obtained when the exposure wavelength λ (365 nm) was employed in the exposure step. However, even when light having a wavelength λ in the range of 300 to 450 nm, which is generally called the ultraviolet region, is used, results approximately equivalent to those described above can be obtained. The reasons for this are as follows. That is, since the range of the diameter $D_A$ (9 to 12 µm) of the light transmitting portion in the above example is approximately 25 to 33 times the exposure light wavelength λ (365 nm), even when the exposure wavelength is changed, the diffraction effect is not substantially changed as long as the wavelength is in the range of 300 to 450 nm as described above. In addition, since the range of the exposure gap $G_A$ (150 to 250 µm) in the above example is approximately 400 to 700 times the exposure wavelength λ, even when the exposure wavelength is changed, the spread of the diffracted light is not substantially changed as long as the wavelength is in the range of 300 to 450 nm as described above.

In general, the open area ratio of the mask is preferably approximately 20 to 40%. When the open area ratio is less than 20%, the distance between the island shape light transmitting portions is increased, the area of the flat portions on the surface of the resin layer is increased, and as a result, a reflection surface at which the regular reflection frequently occurs is adversely formed. In addition, when the open area ratio is more than 40%, the distance between the island shape light transmitting portions adjacent to each other is decreased, since the concave portions formed on the surface of the resin layer are likely to be brought into contact with each other, the area of the flat portions is also increased, and as a result, a reflection surface at which the regular reflection frequently occurs is adversely formed.

Furthermore, the exposure amount is preferably in the range of approximately 70 to 90 mJ under the conditions described above. This exposure amount is preferably controlled so that the photosensitive resin is not totally removed (ratio of remaining film is approximately 5 to 20%) by a maximum exposure amount (exposure amount at a central position of the light transmitting portion) determined by the size of the light transmitting portion and the exposure gap. When the entire photosensitive resin is removed by the maximum exposure amount, since the underlayer surface is exposed at the bottom of the concave portion formed in the resin layer, the reflection surface formed on this exposed underlayer surface becomes flat, and as a result, the regular reflection occurs.

Second Embodiment: Reflection Substrate

Figure 8:
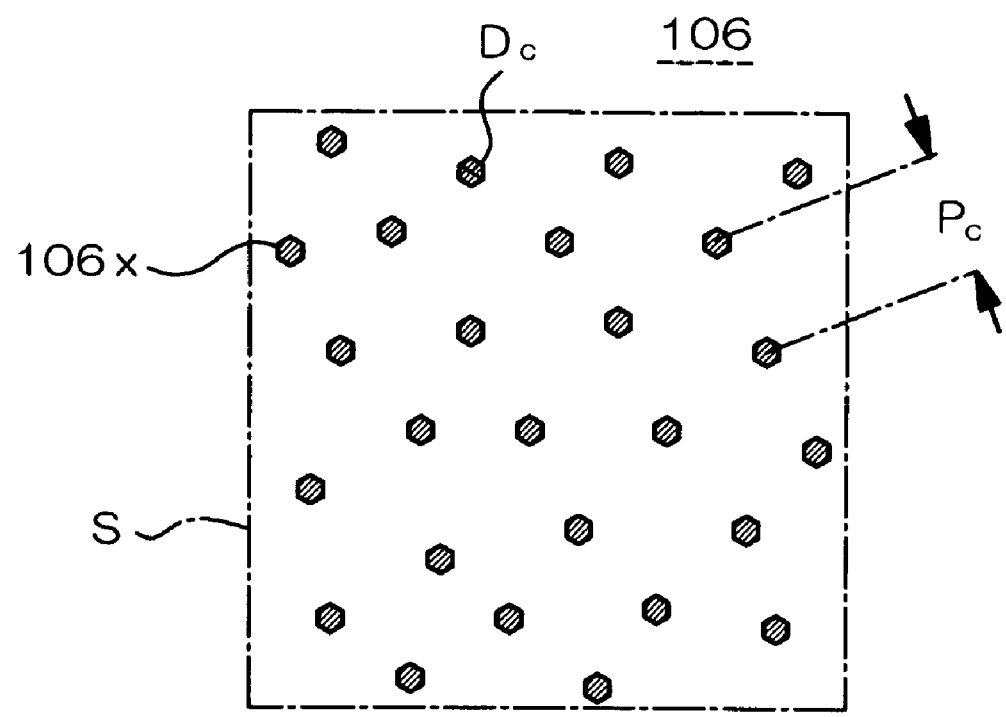
FIG. 8 is an explanatory view of a mask pattern of a unit area S of a mask used for a manufacturing method of an electro-optical device substrate of a second embodiment according to the present invention.

Next, referring to FIGS. 8 to 11, a second embodiment of the present invention will be described. In the first embodiment, the light transmitting portions 102x, which are formed as a plurality of islands, are dispersed in the mask 102; however, in a mask 106 of this embodiment, light shading portions 106x, which are formed as a plurality of islands, are dispersed as shown in FIG. 8. In addition, the peripheries of the light shading portions 106x are surrounded by a light transmitting portion. This light shading portions 106x can be formed from a shading layer formed on a surface made of a light transmitting material equivalent to that used in the first embodiment. The light shading portions 106x are randomly dispersed in the unit region S so as to have approximately uniform density distribution.

In the mask 106, a diameter Dc of the light shading portion 106x is set to 9 or 10 μm, and the average distance Pc between the light shading portions 106x is set to approximately 14 μm. In this case, the open area ratio is approximately 70%, and hence the shading ratio is approximately 30%. Next, the same photosensitive resin as that of the first embodiment is applied to have a thickness of 2 μm, and by using the mask 106 described above, exposure is performed at an exposure gap G of 70 μm by an exposure amount of 30 to 40 mJ. In this embodiment, since the open area ratio of the mask 106 is approximately 2 to 2.5 times that of the first embodiment, in order to form convex portions having sufficient scattering properties on parts of the surface of the resin layer which correspond to the light shading portions 106x and in order to smooth sufficiently the surface irregularities formed by these convex portions, the exposure gap is set to approximately 40 to 50% of that in the first embodiment, and in addition, the exposure amount is also set to approximately 40 to 50% of that in the first embodiment. In addition, the other conditions are all set equivalent to those in the first embodiment, and a resin layer having surface irregularities is formed.

Figure 9:
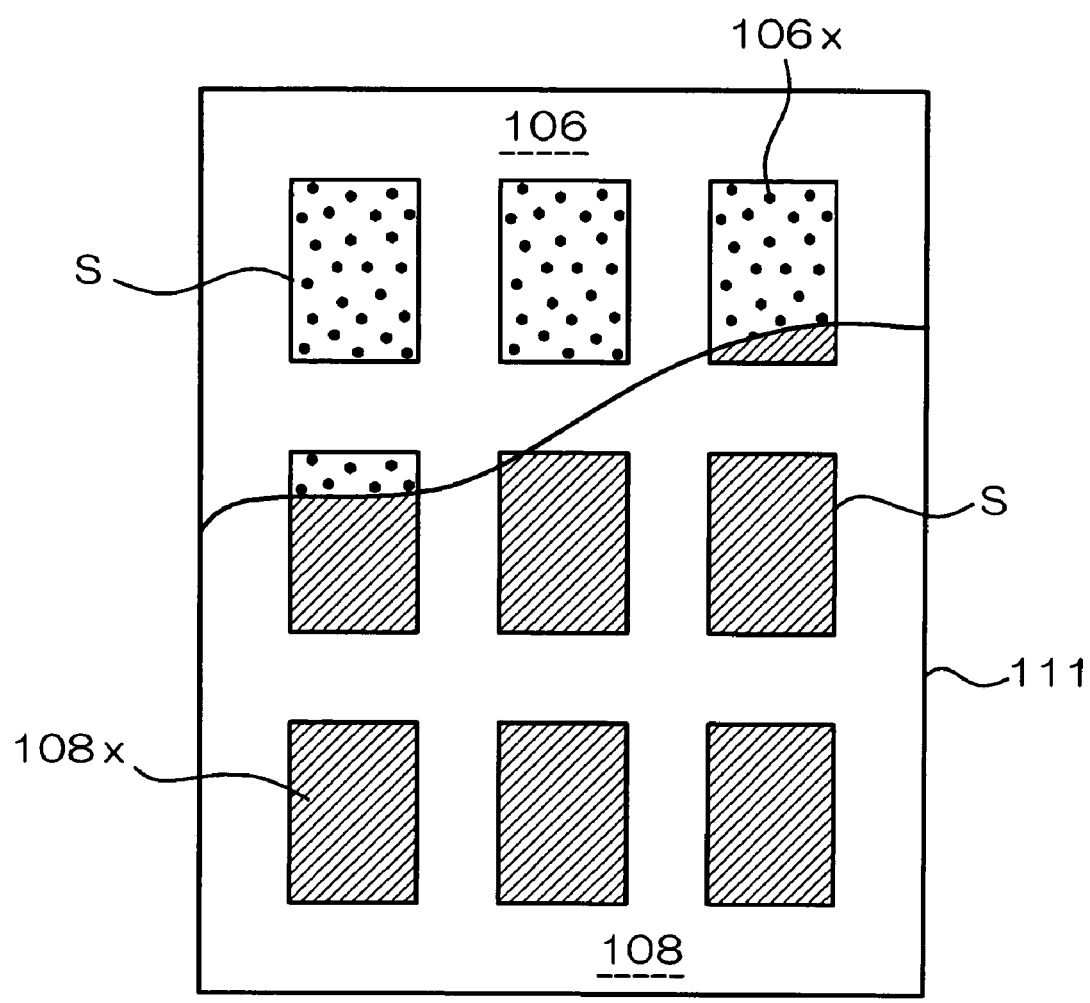
FIG. 9 is an explanatory view showing the state in which a mask used in a first exposure step overlaps a mask used in a second exposure step according to the second embodiment.

In this embodiment, since the exposure amount is decreased as described above, after the exposure is first performed with the mask 106, a second exposure is sequentially performed by a relatively large exposure amount with a second mask 108 as shown in FIG. 9. The second mask 108 used in this second exposure is formed to entirely shade the unit regions S as described above, in which the surface irregularities have been formed, with shading layers 108x, and to allow light to pass through the other parts, that is, parts other than the unit regions. Accordingly, the exposed state in the unit regions S is not influenced with the second exposure at all, and only the parts other than the unit regions S are strongly exposed. Subsequently, by development, the surface irregularities are formed in the unit regions S in accordance with the exposed state obtained using the mask 106, and the resin layer in the parts other than the unit regions S is substantially removed. In this embodiment, exposure is performed twice; however, the exposure for forming the surface irregularities of the resin layer is performed only once as in the case of the first embodiment.

In the surface irregularities formed in this embodiment, island shape convex portions are dispersed corresponding to the light shading portions 106x of the mask 106. That is, compared to the surface irregularities formed in the first embodiment in which the island shape concave portions are dispersed, the irregularities are approximately opposite to those in the first embodiment. Hence, the reflection surface formed on the resin layer obtained in the first embodiment and that obtained in the second embodiment have scattering properties different from each other.

Figure 10:
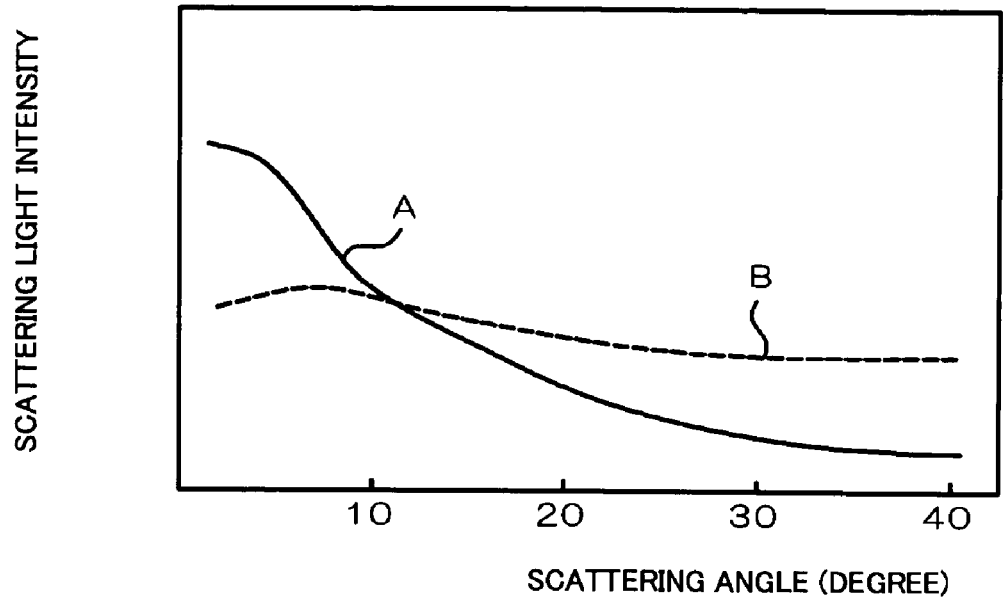
FIG. 10 is a graph showing the dependence of scattering light intensity on scattering angle of a reflection layer obtained in the first and the second embodiments.

FIG. 10 is a graph showing the scattering angle dependence of scattering light intensity obtained from the reflection surfaces of the first and the second embodiments. In the figure, A indicates the data of the reflection surface formed in the first embodiment, and B indicates the data of the reflection surface formed in the second embodiment. In the reflection surface of the first embodiment, as the scattering angel is increased, the scattering light intensity is considerably decreased. On the other hand, in the reflection surface of the second embodiment, the scattering angel dependence of the scattering light intensity is small, and even when the scattering angle is increased, the decrease in scattering light intensity is not significant. Hence, a brighter display can be viewed in a wider viewing angle range.

Figure 11A:
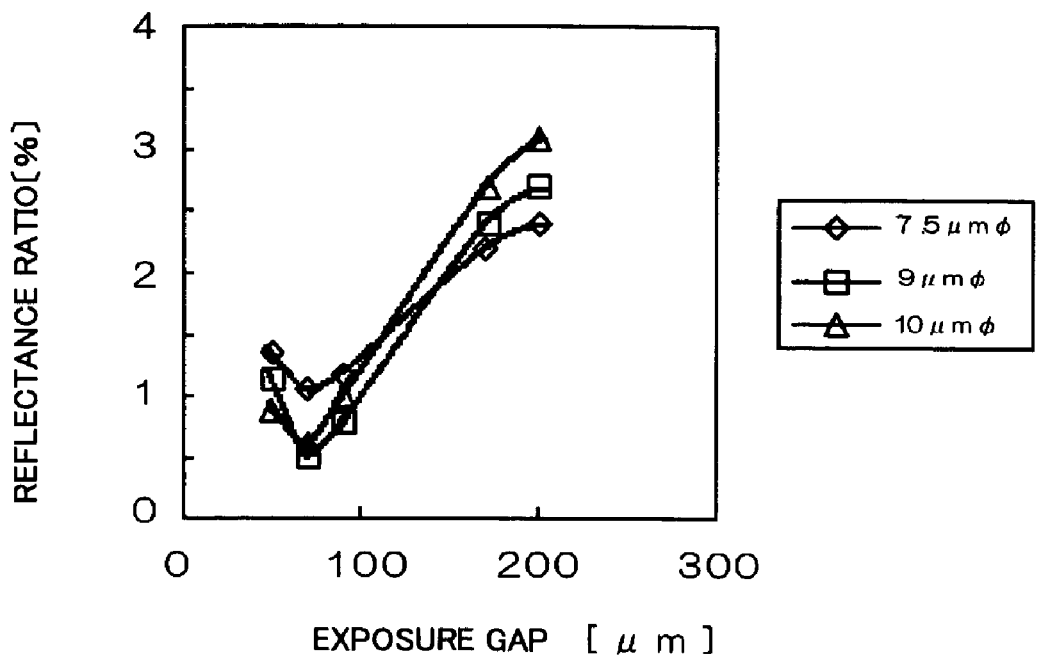
FIG. 11 includes a graph in FIG. 11(a) showing the relationship of a diameter D and an exposure gap G of a light transmitting portion of a mask used in the second embodiment with the regular reflectance ratio (parallel reflectance ratio) of a formed resin layer, and a graph in FIG. 11(b) showing the relationship of the thickness of a photosensitive resin and an exposure gap G with the regular reflectance ratio (parallel reflectance ratio) of a formed resin layer.

By a basic manufacturing method according to this embodiment, as shown in FIG. 11(a), the exposure gap dependence of regular reflectance ratio of a resin layer was measured by a diameter Dc (7.5, 9, and 10 μm) of a light shading portion 106x. In this measurement, all the initial thickness of the resin layers were set to 2.0 μm, and all the open area ratio of the mask was set to approximately 70%. As a result, it was found that when the diameter Dc of the light shading portion 106x is decreased, the exposure gap dependence of regular reflectance ratio is small, and that when the diameter Dc of the light shading portion 106x is increased, the rate of change in regular reflectance ratio is increased as the exposure gap is changed. Hence, the diameter Dc of the light shading portion 106x is preferably set in the range of approximately 8.0 to 12 μm. When the diameter Dc is less than 8 μm, since the convex portions are less likely to be formed, it becomes difficult to control the regular reflectance ratio by the exposure gap, and as a result, the control of the reflection properties of the reflection layer becomes difficult. On the contrary, when the diameter Dc is more than 12 μm, flat portions are likely to be formed at the centers of convex portions, the change in regular reflectance ratio is increased in accordance with the change in exposure gap, and as a result, it becomes difficult to obtain the preciseness and/or the reproducibility of reflection properties of the reflection layer.

In addition, regardless of the diameter Dc of the light shading portion 106x, when the exposure gap G is 70 μm or more, the regular reflectance ratio is monotonically increased in accordance with increase in exposure gap; however, when the exposure gap is less than 70 μm, the result was obtained in that when the exposure gap is decreased, the regular reflectance ratio is increased. The reasons for this are believed as follows as is the case of the first embodiment. When the exposure gap is large to some extent, as the exposure gap is increased, the surface irregularities of the resin layer become smooth by the light diffraction phenomenon, and as a result, the regular reflectance ratio is increased. However, when the exposure gap is excessively decreased, since the light diffraction is less likely to occur, smooth irregularities become difficult to obtain, and as the exposure gap is decreased, flat portions and sharp irregular portions are increased so as to form the state in which the two portions mentioned above are mixed together, thereby increasing the regular reflectance ratio.

In this embodiment, even in the region in which the regular reflectance ratio is smaller than that in the first embodiment, a large scattering light intensity can be obtained in the region in which the scattering angle is large, and hence superior display properties can be obtained in the region in which the regular reflectance ratio is small. Hence, according to the above data, as the exposure gap G, the range of 60 to 100 μm is preferable. When the exposure gap G is less than the above range, since the ratio of the flat portions and that of the sharp irregular portions in the surface irregularities are increased as described above, the scattering angle is decreased, and the display becomes dark. On the contrary, when the exposure gap G is more than the range described above, since convex portions are less likely to be formed by increase in degree of light diffraction, the reflection surface becomes flat on the whole, and as a result, problems may arise which are caused by the regular reflection.

Figure 11B:
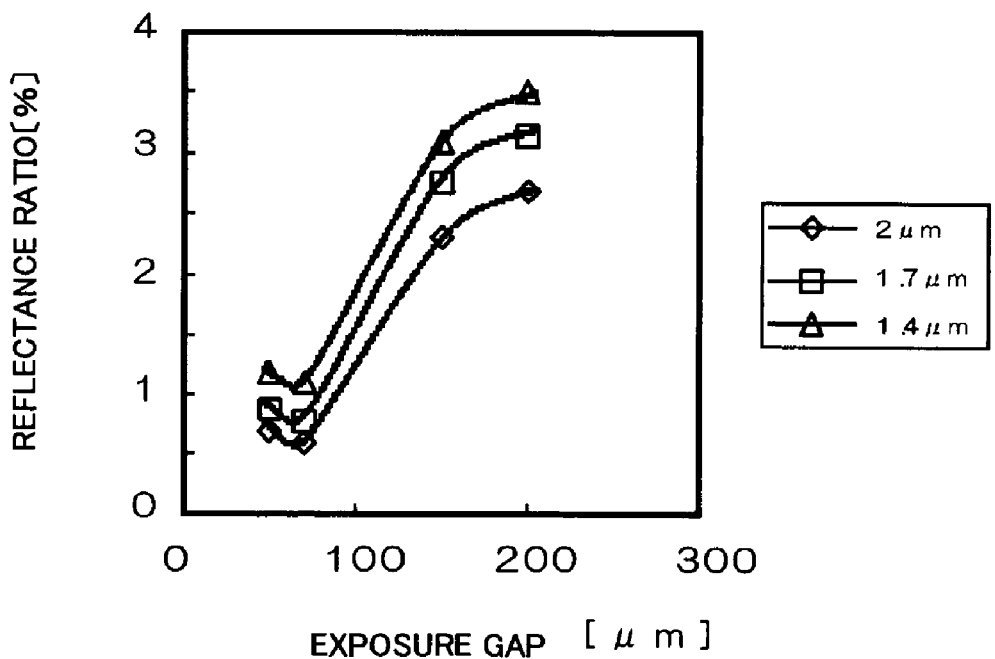

FIG. 11(*b*) is a graph showing the exposure gap dependence of regular reflectance ratio obtained when the resin layers having initial thickness of 1.4, 1.7, and 2.0 μm were used. In this case, the diameter Dc of the light shading portion 106x of the mask was set to 10 μm, and all the open area ratios were set to 70%. When the thickness of the resin layer is changed, the exposure gap dependence of regular reflectance ratio is not substantially changed; however, as the initial thickness of the resin layer is decreased, the regular reflectance ratio is increased on the whole. The reason for this is believed that when the resin layer has a small thickness, since the underlayer surface is exposed at portions other than the convex portions formed by exposure, the regular reflectance is increased. In addition, in this embodiment, since the open area ratio of the mask is high, in development or the like, the resin layer is likely to be peeled off when the thickness thereof is small. Hence, in this embodiment, that is, in the case in which the mask is formed so that the island shape light shading portions are dispersed, and the open area ratio of the mask is more than 50%, the thickness of the resin layer is preferably formed slightly larger (such as 0.3 μm) than that obtained in the case of the first embodiment, that is, in the case in which the mask is formed so that the island shape light transmitting portions are dispersed, and the open area ratio of the mask is less than 50%.

In addition, in general, the open area ratio of the mask is preferably in the range of approximately 60 to 80%. When the open area ratio is more than 80%, since the distance between the island shape light shading portions is increased, the area of the flat portions of the surface of the resin layer is increased, and as a result, the reflection surface at which the regular reflection occurs frequently is formed. When the open area ratio is less than 60%, since the distance between the island shape light shading portions adjacent to each other is decreased, the convex portions formed on the surface of the resin layer are likely to be brought into contact with each other, and as a result, the area of the flat portions is also increased, resulting in the formation of the reflection surface at which the regular reflection occurs frequently.

Furthermore, the exposure amount is preferably in the range of approximately 30 to 40 mJ under the conditions described above. This exposure amount is preferably controlled so that the photosensitive resin is not totally removed (ratio of remaining film is approximately 5 to 50%) by a maximum exposure amount (exposure amount at a central position between the light shading portions) determined by the distance between the light shading portions and the exposure gap. When the entire photosensitive resin is removed by the maximum exposure amount, since the underlayer surface is exposed at the bottom of the concave portion formed in the resin layer, the reflection surface portion formed on this exposed underlayer surface becomes flat, and as a result, the regular reflection occurs.

Third Embodiment: Electro-optical Device

Next, the structure and a manufacturing method of an electro-optical device using a reflection substrate formed by the above manufacturing method of the reflection substrate will be described using the liquid crystal display device 200 as an example shown in FIG. 12.

Figure 12:
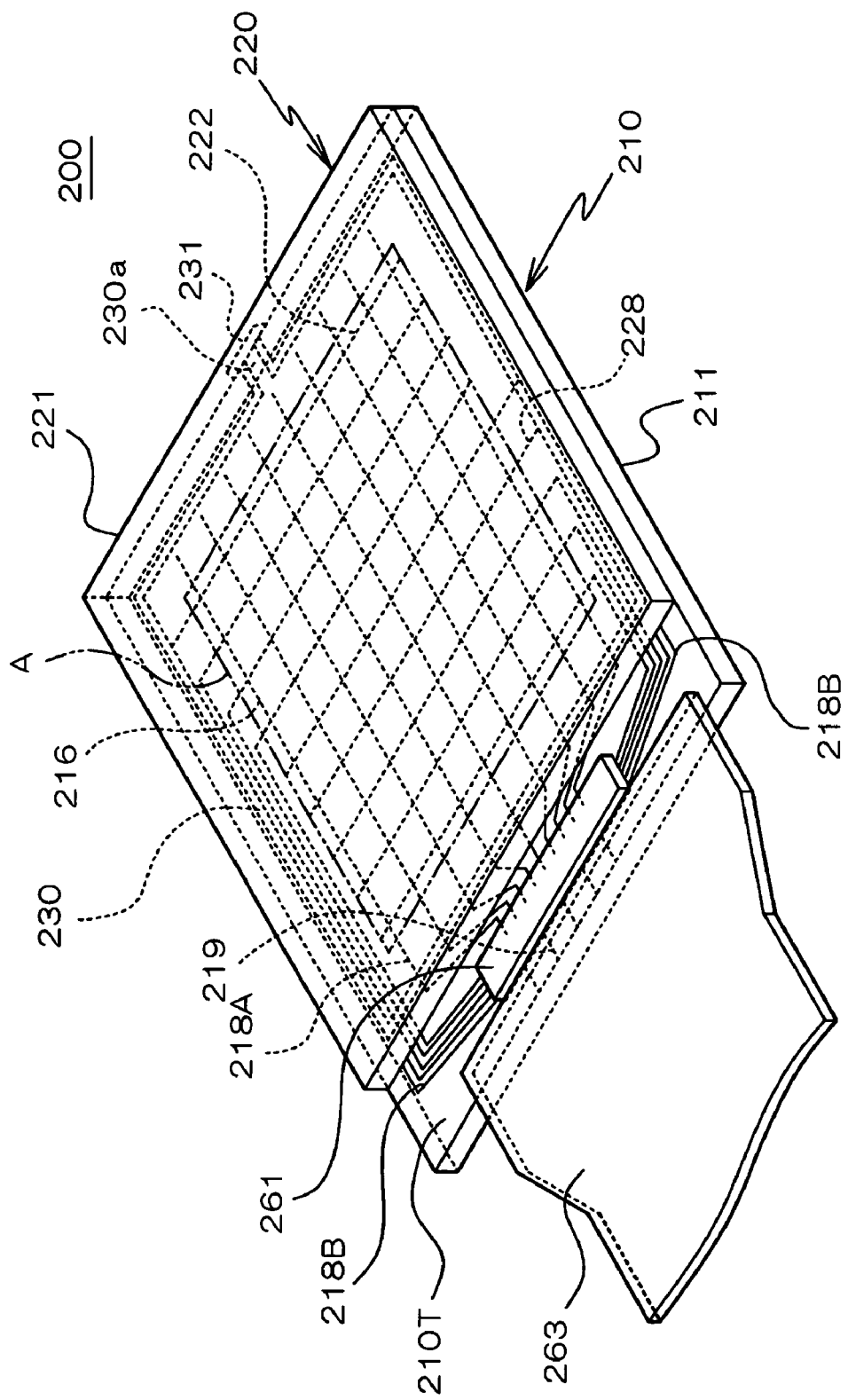
FIG. 12 is a schematic perspective view showing an overview of a liquid crystal display device of a third embodiment formed by a manufacturing method of an electro-optical device according to the present invention.

FIG. 12 is a schematic perspective view showing the appearance of the liquid crystal display device 200 formed in accordance with the embodiment of a manufacturing method of an electro-optical device, according to the present invention, FIG. 13(*a*) is a schematic cross-sectional view of the liquid crystal display device 200, and FIG. 13(*b*) is an enlarged partial plan view of a reflection substrate 210 of the liquid crystal display device 200. In the figures, only a liquid crystal panel portion having a transflective type passive matrix structure is shown; however, in addition to the elements shown in the figures, whenever necessary, a lighting device such as a backlight or a front light, a case body, and the like are also provided for a liquid crystal display device which is practically formed.

As shown in FIG. 12, in the liquid crystal display device 200, the reflection substrate 210 having a transparent first substrate 211 made of a glass plate, a synthetic resin plate, or the like is bonded to a counter substrate 220 having a second substrate 221 as is the first substrate 211 with a sealing material 230 so that the two substrate oppose each other, and after liquid crystal 232 is injected inside the sealing material 230 through an injection port 230a, the injection port 230a is plugged with a plugging material 231, thereby forming a cell structure.

On the internal surface of the first substrate 211 (surface opposing the second substrate 221), a plurality of strip-shaped transparent electrodes 216 are formed in parallel by sputtering or the like, and on the internal surface of the second substrate 221, a plurality of strip-shaped transparent electrodes 222 are formed in parallel by the same method as that described above. In addition, the transparent electrodes 216 are electrically connected to wires 218A, and the transparent electrodes 222 are electrically connected to wires 228. The transparent electrodes 216 and the transparent electrodes 222 intersect orthogonally each other, a great number of pixels are arranged in a matrix in the intersecting regions therebetween, and this pixel arrangement forms a liquid crystal display region A.

The first substrate 211 has a substrate protruding portion 210T protruding outside from the second substrate 221. On this substrate protruding portion 210T, there are provided the wires 218A; wires 218B which are electrically connected with the wires 228 via vertical conductive portions formed of parts of the sealing material 230; and an input terminal portion 219 which is not directly contacted with the wires described above and which is formed of a plurality of wire patterns. In addition, on the substrate protruding portion 210T, a semiconductor IC 261 including a liquid crystal drive circuit is mounted so as to be electrically connected to these wires 218A, 218B, and the input terminal portion 219. Furthermore, on the end portion of the substrate protruding portion 210T, a flexible circuit board 263 is mounted so as to be electrically connected to the input terminal portion 219.

In this liquid crystal display device 200, as shown in FIG. 13, on the external surface of the first substrate 211, a retardation plate (¼ wavelength plate) 240 and a polarizer 241 are disposed, and on the external surface of the second substrate 221, a retardation plate (¼ wavelength plate) 250 and a polarizer 251 are disposed.

Detailed Structure of Reflection Substrate 210 and Counter Substrate 220

Figure 13A:
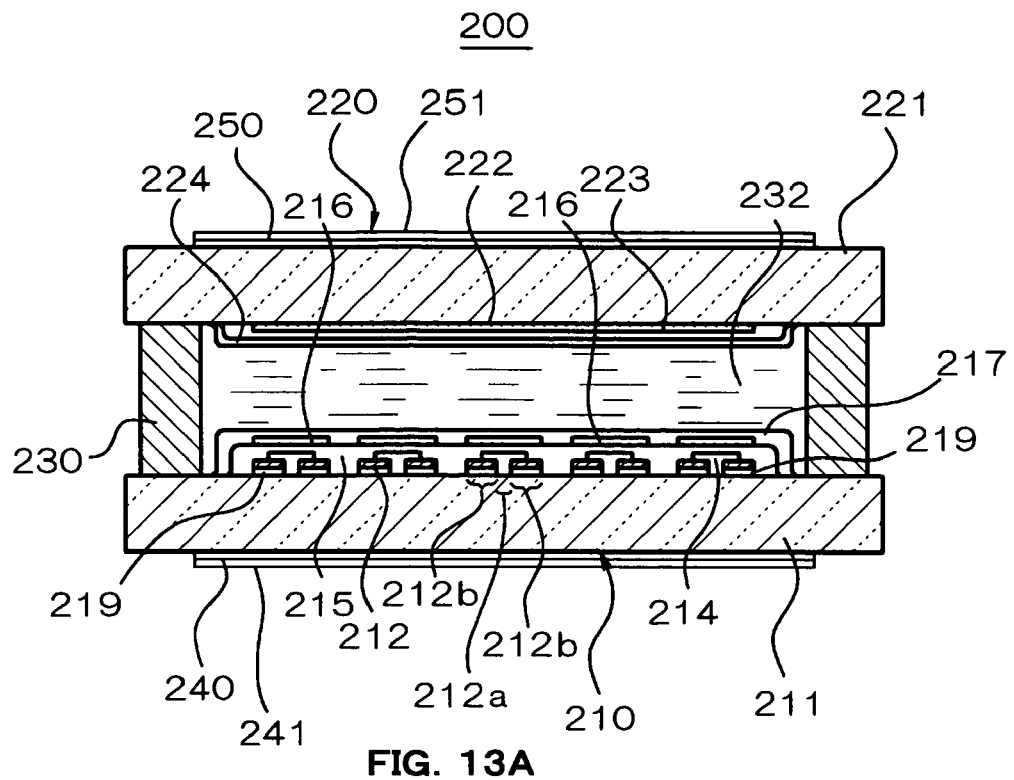
FIG. 13 includes a schematic partial cross-sectional view in FIG. 13(a) of the structure of a liquid crystal display device formed by a manufacturing method of the electro-optical device and a schematic partial plan view in FIG. 13(b) showing the structure of a substrate of the electro-optical device.

Next, referring to FIGS. 13(a) and 13(b), the detailed structures of the reflection substrate 210 and the counter substrate 220 will be described.

In the reflection substrate 210, transparent resin layers 219 are formed on a surface of the first substrate 211. On this resin layers 219, reflection layers 212 are formed, and window portions 212a are formed in the individual pixels. In the reflection layer 212, a part other than the window portion 212a is a reflection portion 212b which substantially reflects light. In this embodiment, the reflection layer 212 having the window portion 212a and the reflection portion 212b is formed in each pixel. Alternatively, the reflection layers 212 may be integrally formed over the entire liquid crystal display region A, and the window portion 212a may only be formed in each pixel.

The resin layer 219 and the reflection layer 212 correspond to the resin layer 119 and the reflection layer 112, respectively, formed in the manufacturing method of the reflection substrate described above, and they can be formed by the same manufacturing methods as those described above. Hence, description of the manufacturing methods thereof will be omitted. In addition, the structure of the reflection substrate 210 shown in FIG. 13 corresponds to the reflection substrate 110'. That is, in addition to the window portion 212a provided in the reflection layer 212, a window portion is also provided in the resin layer 219 disposed thereunder so as to overlap the window portion 212a.

Color layers 214 are formed on the reflection layers 212, and on the color layers 214, a surface protection layer (overcoat layer) 215 made of transparent resin or the like is further formed. The color layers 214 and the surface protection layer 215 form a color filter.

In general, the color layers 214 are formed by dispersing a coloring agent such as a pigment or a dye in a transparent resin so as to have a predetermined tone. As color tones of the color layers, for example, a primary color filter formed of combination of three colors, R (red), G (green), and B (blue), may be mentioned, and in addition to that, various other color tones, such as complementary colors, may also be used. In general, a color resist composed of a photosensitive resin mixed with a coloring agent such as a pigment or a dye is applied onto a substrate surface, and unnecessary parts of the resin are removed by a photolithographic method, thereby forming a color layer having a predetermined color pattern. In this case, when a plurality of color layers having different color tones is formed, the process described above is repeated.

Figure 13B:
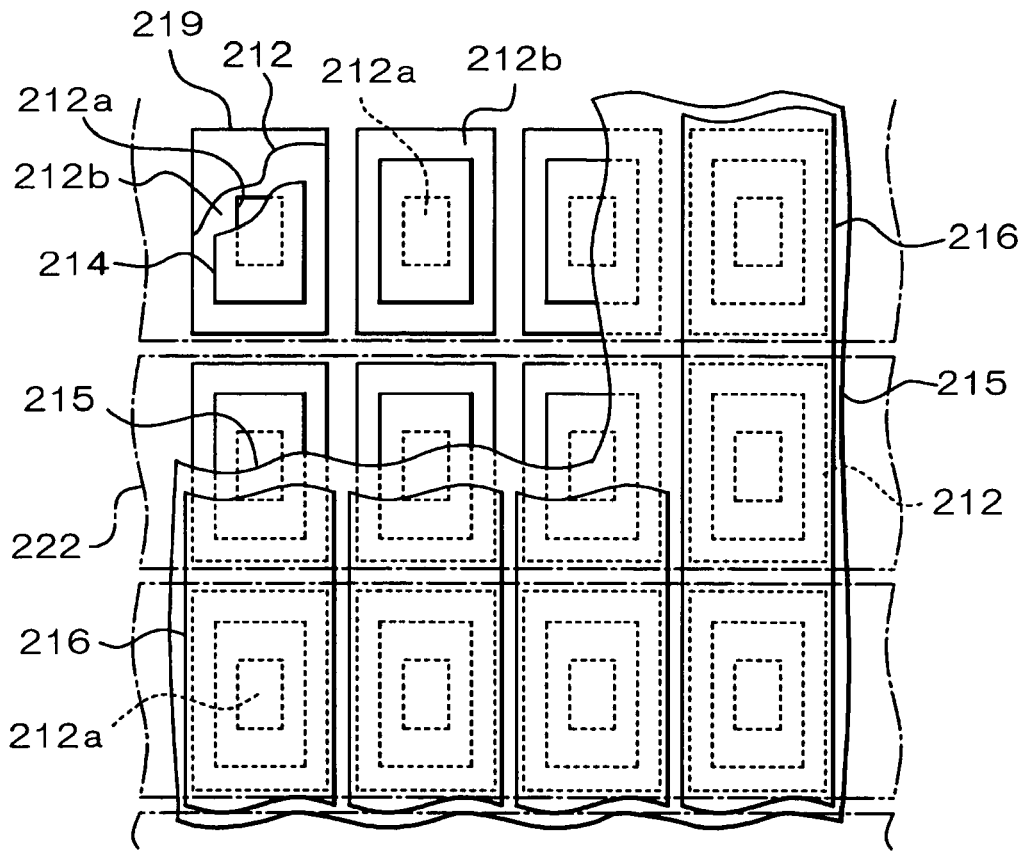

As the arrangement pattern of the color layers, in the example shown in FIG. 13(b), a stripe arrangement is used. In addition to this stripe arrangement, various patterns such as a delta arrangement or an oblique mosaic arrangement may also be used. In addition, around the individual color layers of RGB, a shading film (black matrix or black mask) for shading light region between the pixels may be formed as parts of the color layers.

On the surface protection layer 215, the transparent electrodes 216 made of transparent conductive material such as indium tin oxide (ITO) are formed by sputtering or the like. The transparent electrodes 216 have a strip shape and are extended in the vertical direction in FIG. 13(b), plurality of transparent electrode 216 are arranged in parallel so as to form a stripe pattern. On the transparent electrodes 216, an alignment film 217 made of a polyimide resin or the like is formed.

In this embodiment, as shown in FIG. 13(b), the color layer 214 forming the color filter is formed planarly overlapping so as to cover the entire window portion 212a of the reflection layer 212 in each pixel and, in addition, is extended from the region at which the window portion 212a is covered with the color layer to the reflection portion 212b around the window portion 212a.

In addition, the color layer 214 is not provided over the entire pixel and is formed so as to overlap a part of the reflection layer 212. That is, in the reflection layer 212, there are a region (inside peripheral region which is in the vicinity of the window portion 212a shown in the figure) which overlaps the color layer 214 in plan view and a region (outside peripheral region shown in the figure) which does not overlap the color layer 214 in plan view.

In the liquid crystal display device 200, on the second substrate 221 made of a glass or the like of the counter substrate 220 facing the reflection substrate 210, the transparent electrodes 222 equivalent to those described above are formed, and on the transparent electrodes 222, a hard protection film 223 made of $SiO_2$ or $TiO_2$ is formed. Furthermore, on the hard protection film 223, an alignment film 224 similar to that described above is provided.

Fourth Embodiment: Electro-optical Device

Next, another electro-optical device having a structure different from that described above will be described with reference to FIGS. 14 and 15. The electro-optical device of this embodiment is an active type liquid crystal display device 300 provided with a reflection substrate 310. In this liquid crystal display device 300, the reflection substrate 310 and a counter substrate 320, which face each other, are bonded to each other with a sealing material 330, and liquid crystal 332 is enclosed between the two substrates.

Figure 14:
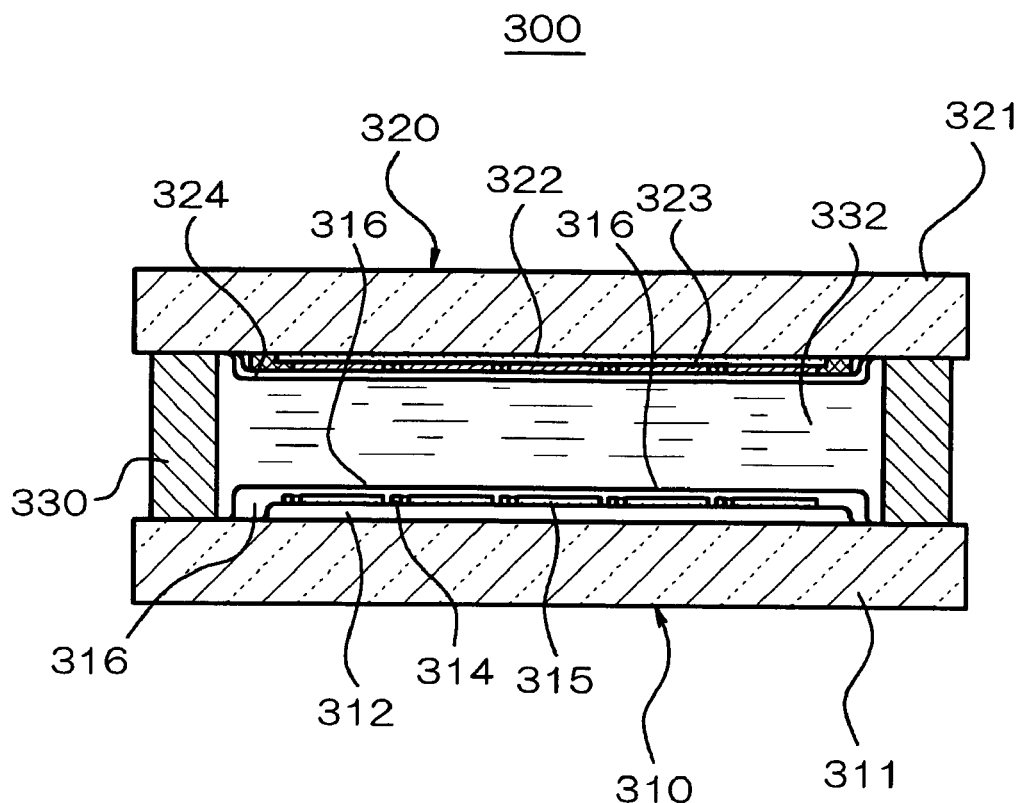
FIG. 14 is a schematic cross-sectional view of the structure of a liquid crystal display device according to a fourth embodiment.

In the reflection substrate 310, on the internal surface of a substrate 311, as shown in FIG. 14, pixel electrodes 315 which also serve as a reflection layer are provided on a resin layer 312 having surface irregularities as those of the resin layer described above. On the pixel electrodes 315, an alignment film 316 is formed. In addition, on the internal surface of the reflection substrate 310, scanning lines 313 indicated by a dotted line shown in FIG. 15 and data lines 314, the cross-section of which is shown in FIGS. 14 and 15, are formed so as to cross or orthogonally intersect each other.

Figure 15:
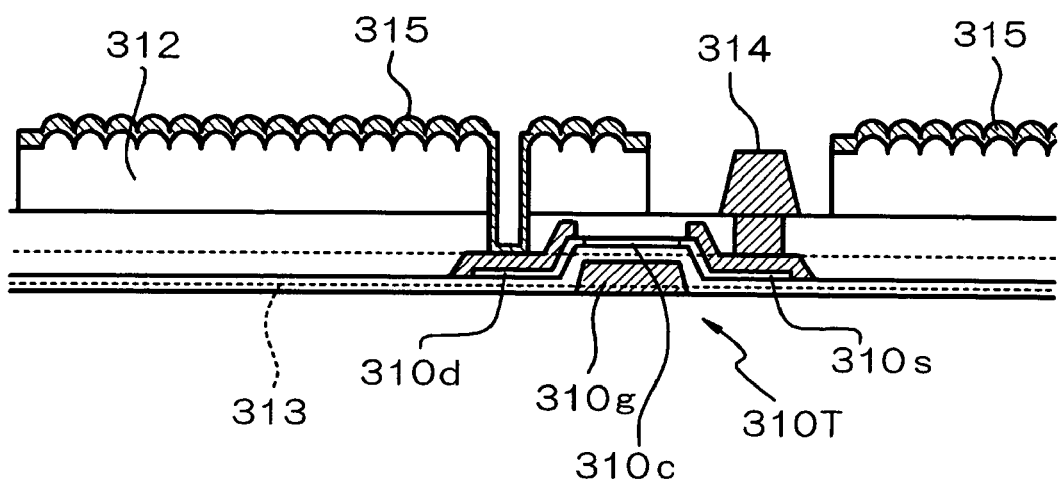
FIG. 15 is an enlarged partial cross-sectional view of one of substrates of the liquid crystal display device according to the fourth embodiment.

Under the pixel electrode 315, a TFT (thin-film transistor) 310T is formed as shown in FIG. 15. In this TFT 310T, a semiconductor layer having a channel region 310c, a source region 310s, and a drain region 310d is formed; the channel region 310c is provided to oppose a gate electrode 310g, which is electrically connected to the scanning line 313, via an insulating film provided therebetween; the source region 310s is electrically connected to the data line 314; and the drain region 310d is electrically connected to the pixel electrode 315. In addition, the TFT 310T is not limited to the reverse stagger structure shown in the figure, and the structure in which the gate electrode is provided above the channel layer may also be used. In addition, a known lightly doped drain (LDD) structure may also be used.

As shown in FIG. 14, on the internal surface of a substrate 321 of the counter substrate 320, counter electrodes 322 formed of a transparent conductive material such as ITO are formed, and on the counter electrodes 322, appropriate color layers 323 are provided to form a predetermined arrangement, thereby forming a color filter similar to that obtained in the third embodiment. Furthermore, on the color filter, an alignment film 324 is formed.

In the liquid crystal display device 300 thus formed, an electrical potential supplied by the data line 314 is supplied to the pixel electrode 315 in a pixel selected by the scanning line 313, and the alignment of the liquid crystal 332 is changed in accordance with the electrical field generated between the pixel electrode 315 and the counter electrode 322, thereby displaying a desired image. In addition to the active matrix type liquid crystal display device using a TFT as a switching element as described above, the present invention can also be applied to that using a TFD (thin-film diode) as a switching element.

In addition to the liquid crystal display devices shown in the figures by way of example, the electro-optical device of the present invention can also be applied to various electro-optical devices such as electroluminescent devices, organic electroluminescent devices, plasma display devices, electrophoretic display devices, and devices using an electron emission element (such as field emission display and surface-conduction electron-emitter display).

The entire disclosure of Japanese Patent Application Nos. 2002-298986 filed Oct. 11, 2002 and 2003-294688 filed Aug. 18, 2003 are incorporated by reference.

What is claimed is:

1. A method for manufacturing an electro-optical device substrate, comprising:
an exposure step of exposing a photosensitive resin disposed on a substrate using a mask pattern provided with a light transmitting portion and a light shading portion, the light transmitting portion further comprising light transmitting portions formed as a plurality of islands, the light transmitting portions being dispersed in the mask pattern, and the light shading portion being formed around the peripheries of the light transmitting portions such that a plurality of concave portions, which correspond to the light transmitting portions, are formed on the surface of the resin layer;
a developing step of developing the exposed resin; and
a reflective layer forming step of forming a reflection layer on the resin,
wherein a size of at least one of the light transmitting portion and the light shading portion, and an exposure gap between the mask pattern and the resin are set so as to obtain an exposure intensity profile having an increasing and decreasing curve along a surface of the resin in the exposure step, such that, in the developing step, the resin is formed into a resin layer having surface irregularities in accordance with the exposure intensity profile; and
an exposure wavelength $\lambda$ in the exposure step is set in a range of 300 nm to 450 nm, a diameter of the light transmitting portions is set in a range of approximately 9 $\mu$m to 12 $\mu$m, and the exposure gap is set in a range of approximately 150 $\mu$m to 250 $\mu$m.

2. The method for manufacturing an electro-optical device substrate according to claim 1, further comprising a transmitting portion forming step of forming transmitting portions by removing parts of the reflection layer.

3. The method for manufacturing an electro-optical device substrate according to claim 2, wherein, in the transmitting portion forming step, the parts of the reflection layer are removed together with parts of the resin layer provided thereunder.

4. A method for manufacturing an electro-optical device having an electro-optical material; an electric field-applying structure having an electrode which applies an electric field to the electro-optical material so as to control the optical properties thereof; a resin layer which overlaps the electro-optical material in plan view and which has surface irregularities; and a reflection layer which is provided on the surface irregularities and which has a reflection surface in conformity with the surface irregularities, the method comprising:
an exposure step of exposing a photosensitive resin using a mask pattern having a light transmitting portion and a light shading portion, the light transmitting portion further comprising light transmitting portions formed as a plurality of islands, the light transmitting portions being dispersed in the mask pattern, and the light shading portion being formed around the peripheries of the light transmitting portions such that a plurality of concave portions, which correspond to the light transmitting portions, are formed on the surface of the resin layer; and
a developing step of developing the exposed resin for forming the resin layer,
wherein a size of at least one of the light transmitting portion and the light shading portion, and an exposure gap between the mask pattern and the resin are set so as to obtain an exposure intensity profile having an increasing and decreasing curve along a surface of the resin in the exposure step, such that, in the developing step, the resin layer is formed with the surface irregularities which are in accordance with the exposure intensity profile; and
an exposure wavelength $\lambda$ in the exposure step is set in a range of 300 nm to 450 nm, a diameter of each of the light transmitting portions is set in a range of approximately 9 $\mu$m to 12 $\mu$m, and the exposure gap is set in a range of approximately 150 $\mu$m to 250 $\mu$m.

5. The method for manufacturing an electro-optical device according to claim 4, further comprising a transmitting portion forming step of forming transmitting portions by removing parts of the reflection layer.

6. The method for manufacturing an electro-optical device according to claim 5, wherein, in the transmitting portion forming step, the parts of the reflection layer are removed together with parts of the resin layer provided thereunder.

7. A method for manufacturing an electro-optical device substrate, comprising:

an exposure step of exposing a photosensitive resin disposed on a substrate using a mask pattern provided with a light transmitting portion and a light shading portion, the light shading portion further comprising light shading portions formed as a plurality of islands, the light shading portions being dispersed in the mask pattern, and the light transmitting portion being formed around the peripheries of the light shading portions such that a plurality of convex portions, which correspond to the light shading portions, are formed on the surface of the resin layer;

a developing step of developing the exposed resin; and a reflective layer forming step of forming a reflection layer on the resin, wherein a size of at least one of the light transmitting portion and the light shading portion, and an exposure gap between the mask pattern and the resin are set so as to obtain an exposure intensity profile having an increasing and decreasing curve along a surface of the resin in the exposure step, such that, in the developing step, the resin is formed into a resin layer having surface irregularities in accordance with the exposure intensity profile; and an exposure wavelength $\lambda$ in the exposure step is set in a range of 300 nm to 450 nm, a diameter of the light shading portions is set in a range of approximately 8 $\mu$m to 12 $\mu$m, and the exposure gap is set in a range of approximately 60 $\mu$m to 100 $\mu$m.

8. The method for manufacturing an electro-optical device substrate according to claim 7, further comprising a transmitting portion forming step of forming transmitting portions by removing parts of the reflection layer.

9. The method for manufacturing an electro-optical device substrate according to claim 8, wherein, in the transmitting portion forming step, the parts of the reflection layer are removed together with parts of the resin layer provided thereunder.

10. A method for manufacturing an electro-optical device having an electro-optical material; an electric field-applying structure having an electrode which applies an electric field to the electro-optical material so as to control the optical properties thereof; a resin layer which overlaps the electro-optical material in plan view and which has surface irregularities; and a reflection layer which is provided on the surface irregularities and which has a reflection surface in conformity with the surface irregularities, the method comprising:

an exposure step of exposing a photosensitive resin using a mask pattern having a light transmitting portion and a light shading portion, the light shading portion further comprising light shading portions formed as a plurality of islands, the light shading portions being disposed in the mask pattern, and the light transmitting portion being formed around the peripheries of the light shading portions such that a plurality of convex portions, which correspond to the light shading portions, are formed on the surface of the resin layer; and a developing step of developing the exposed resin for forming the resin layer, wherein a size of at least one of the light transmitting portion and the light shading portion, and an exposure gap between the mask pattern and the resin are set so as to obtain an exposure intensity profile having an increasing and decreasing curve along a surface of the resin in the exposure step, such that, in the developing step, the resin layer is formed with the surface irregularities which are in accordance with the exposure intensity profile; and an exposure wavelength $\lambda$ in the exposure step is set in a range of 300 nm to 450 nm, a diameter of each of the light shading portions is set in a range of approximately 8 $\mu$m to 12 $\mu$m, and the exposure gap is set in a range of approximately 60 $\mu$m to 100 $\mu$m.

11. The method for manufacturing an electro-optical device according to claim 10, further comprising a transmitting portion forming step of forming transmitting portions by removing parts of the reflection layer.

12. The method for manufacturing an electro-optical device according to claim 11, wherein, in the transmitting portion forming step, the parts of the reflection layer are removed together with parts of the resin layer provided thereunder.

* * * * *